(12) United States Patent
Kim et al.

(10) Patent No.: US 10,581,651 B2
(45) Date of Patent: Mar. 3, 2020

(54) APPARATUS AND METHOD FOR TRANSMITTING/RECEIVING SIGNAL IN MULTI-CARRIER SYSTEM

(71) Applicant: Samsung Electronics Co., Ltd., Suwon-si, Gyeonggi-do (KR)

(72) Inventors: Kyeong-Yeon Kim, Hwaseong-si (KR); Yeo-Hun Yun, Hwaseong-si (KR); Sung-Nam Hong, Anyang-si (KR); Chan-Hong Kim, Hwaseong-si (KR); Ji-Yun Seol, Seongnam-si (KR); Yong-Ho Cho, Suwon-si (KR); Ming Hoka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/758,640

(22) PCT Filed: Sep. 7, 2016

(86) PCT No.: PCT/KR2016/010034
§ 371 (c)(1),
(2) Date: Mar. 8, 2018

(87) PCT Pub. No.: WO2017/043866
PCT Pub. Date: Mar. 16, 2017

(65) Prior Publication Data
US 2018/0309601 A1    Oct. 25, 2018

(30) Foreign Application Priority Data
Sep. 10, 2015 (KR) .......................... 10-2015-0128276

(51) Int. Cl.
*H04L 25/03* (2006.01)
*H04L 27/26* (2006.01)

(52) U.S. Cl.
CPC .. *H04L 25/03993* (2013.01); *H04L 25/03006* (2013.01); *H04L 25/03828* (2013.01);
(Continued)

(58) Field of Classification Search
CPC ............ H04L 27/2647; H04L 27/2601; H04L 27/2649; H04L 25/03993; H04L 25/03299;
(Continued)

(56) References Cited

U.S. PATENT DOCUMENTS

| 8,929,495 B2 | 1/2015 | Mestre Pons et al. |
| 2011/0051831 A1 | 3/2011 | Subrahmanya et al. |

(Continued)

FOREIGN PATENT DOCUMENTS

| EP | 2846506 A1 | 3/2015 |
| KR | 10-2008-0021658 A | 3/2008 |

(Continued)

*Primary Examiner* — Betsy Deppe
(74) *Attorney, Agent, or Firm* — Jefferson IP Law, LLP

(57) ABSTRACT

The present invention relates to a 5th-generation (5G) or pre-5G communication system, which is to be provided for supporting a higher data transmission rate after the 4th-generation (4G) communication system, such as long term evolution (LTE). The present invention provides a method for receiving a signal in a multi-carrier system, the method comprising the steps of: performing, with respect to an input signal, a waveform pre-processing operation on the basis of at least one of an equalizing operation and a filtering operation; checking whether the waveform pre-processed signal is a Gaussian proximity signal; and performing soft-de-mapping with respect to the waveform pre-processed signal on the basis of a result of the checking.

20 Claims, 10 Drawing Sheets

(52) U.S. Cl.
CPC .. *H04L 27/2647* (2013.01); *H04L 2025/0342* (2013.01); *H04L 2025/03414* (2013.01); *H04L 2025/03433* (2013.01)

(58) Field of Classification Search
CPC ......... H04L 25/03828; H04L 25/03006; H04L 25/03; H04L 1/0045; H04L 25/08; H04L 25/03821; H04L 2025/03433; H04L 2025/0342; H04L 2025/03414; H04B 1/10; H04B 1/1027; H04B 2001/1045; H04B 25/08; H04B 25/03821; H04B 15/00
See application file for complete search history.

(56) References Cited

U.S. PATENT DOCUMENTS

| | | |
|---|---|---|
| 2011/0142179 A1 | 6/2011 | Cheun et al. |
| 2012/0039379 A1 | 2/2012 | Husen et al. |
| 2014/0211880 A1 | 7/2014 | Sagong et al. |
| 2014/0270012 A1 | 9/2014 | Sagi |
| 2015/0063507 A1 | 3/2015 | Dore et al. |

FOREIGN PATENT DOCUMENTS

| | | |
|---|---|---|
| KR | 10-2011-0068377 A | 6/2011 |
| KR | 10-2012-0064100 A | 6/2012 |
| KR | 10-2014-0096559 A | 8/2014 |

APPARATUS AND METHOD FOR TRANSMITTING/RECEIVING SIGNAL IN MULTI-CARRIER SYSTEM

CROSS-REFERENCE TO RELATED APPLICATION(S)

This application is a U.S. National Stage application under 35 U.S.C. § 371 of an International application filed on Sep. 7, 2016 and assigned application number PCT/KR2016/010034, which claimed the benefit of a Korean patent application No. 10-2015-0128276 filed on Sep. 10, 2015, the entire disclosure of each of these applications is incorporated herein by reference.

BACKGROUND

1. Field

The present disclosure relates to an apparatus and method for transmitting/receiving a signal in a multi-carrier communication system, and more particularly, to an apparatus and method for transmitting/receiving a signal in a multi-carrier communication system having non-orthogonal waveforms.

2. Description of the Related Art

To satisfy demands for wireless data traffic having increased since commercialization of $4^{th}$-generation (4G) communication systems, efforts have been made to develop improved 5th-generation (5G) communication systems or pre-5G communication systems. For this reason, the 5G communication system or the pre-5G communication system is also called a beyond-4G-network communication system or a post-Long-Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, device to device (D2D) communication, a wireless backhaul, a moving network, cooperative communication, coordinated multi-points (CoMPs), and interference cancellation have been developed.

In addition, in a 5G system, hybrid frequency shift keying (FSK) and quadrature amplitude modulation (QAM) (FQAM), which is an advanced coding modulation (ACM) scheme, a sliding window superposition coding (SWSC) scheme, a filter bank multi-carrier (FBMC) scheme which is an evolved access technology, a non-orthogonal multiple access (NOMA) scheme, a sparse code multiple access (SCMA) scheme, and so forth have been developed.

In a current wireless communication system, various schemes such as IoT/machine type communication (MTC), and the like have been proposed. IoT refers to a technology for connecting various machines to Internet by embedding a sensor and a communication function in the machines. Herein, things refer to various embedded systems (computer systems of electronic devices such as smartphones) like home appliances, mobile devices, wearable devices, and so forth. Things connected to IoT have to be connected to the Internet based on a unique Internet protocol (IP) address for identifying each thing, and have embedded therein a sensor for obtaining information from an external environment.

In addition, in a current wireless communication system, communication devices are expected to sharply increase due to various schemes such as IoT/MTC and so froth and data rate increase.

Thus, in line with the sharp increase of the communication devices, there is an urgent demand for giga bit-level wireless communication schemes and a multiple access scheme for various devices.

However, such a demand may not be met simply by expanding an available frequency band, and thus, a next-generation (beyond 4G) mobile communication system needs a more frequency-efficient new multiple access scheme than a cyclic prefixed-orthogonal frequency division multiplexing (CP-OFDM) scheme.

As the new multiple access scheme, multiple access schemes having non-orthogonal waveforms based on sub-carrier-specific filtering or sub-band-specific filtering like a filter bank multi-carrier (FBMC) scheme, a general frequency division multiplexing (GFDM) scheme, a universal filter multi-carrier (UFMC) scheme, and so forth have been discussed.

The multiple access scheme having the non-orthogonal waveform may improve frequency confinement through sub-carrier-specific filtering or sub-band-specific filtering when compared to the CP-OFDM scheme, thereby reducing a guard interval or allowing flexible use of a frequency resource.

As discussed above, the multiple access scheme having the non-orthogonal waveform may increase transmission efficiency and frequency utilization, but may undergo degradation of reception performance due to interference of the non-orthogonal waveform.

To prevent such reception performance degradation due to interference of the non-orthogonal waveform, various schemes have been proposed, a representative scheme of which is an interference attenuation scheme or interference cancellation scheme using a multi-tap equalizer, which is used in an offset orthogonal amplitude (OQAM)-FBMC scheme or the GFDM scheme. However, the interference attenuation scheme or interference cancellation scheme using the multi-tap equalizer increases reception complexity and latency of a signal receiving device.

Hence, a need has emerged for a scheme for efficiently transmitting/receiving a signal in a multi-carrier system having a non-orthogonal waveform.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure provides an apparatus and method for transmitting/receiving a signal in a multi-carrier communication system.

An embodiment of the present disclosure provides an apparatus and method for transmitting/receiving a signal in a multi-carrier communication system, by which reception complexity may be reduced.

An embodiment of the present disclosure provides an apparatus and method for transmitting/receiving a signal in a multi-carrier communication system, by which latency may be reduced.

An embodiment of the present disclosure provides an apparatus and method for transmitting/receiving a signal based on statistic characteristics of residual interference after equalization in a multi-carrier communication system.

An embodiment of the present disclosure provides an apparatus and method for transmitting/receiving a signal in a multi-carrier communication system, by which non-Gaussian characteristics may be increased.

The present invention provides a method for receiving a signal in a multi-carrier communication system, the method including performing waveform pre-processing with respect to an input signal based on at least one of equalization and filtering, checking if the waveform pre-processed signal is a Gaussian proximity signal, and performing soft de-mapping with respect to the waveform pre-processed signal based on a result of the checking.

The present invention provides an apparatus for receiving a signal in a multi-carrier communication system, the apparatus including a waveform pre-processor configured to perform waveform pre-processing with respect to an input signal based on at least one of equalization and filtering, a controller configured to check whether the waveform pre-processed signal is a Gaussian proximity signal, and a soft de-mapper configured to perform soft de-mapping with respect to the waveform pre-processed signal based on a result of the checking.

Other aspects, advantages, and key features of the present disclosure will be processed together with the attached drawings, and will be apparent to those of ordinary skill in the art from the following detailed description disclosing various embodiments of the present disclosure.

Before undertaking the DETAILED DESCRIPTION OF THE INVENTION below, it may be advantageous to set forth definitions of certain words and phrases used throughout this patent document: The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation, and such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, similar reference numerals will be understood to refer to identical or similar elements, features, and structures.

DETAILED DESCRIPTION

Figure 1:
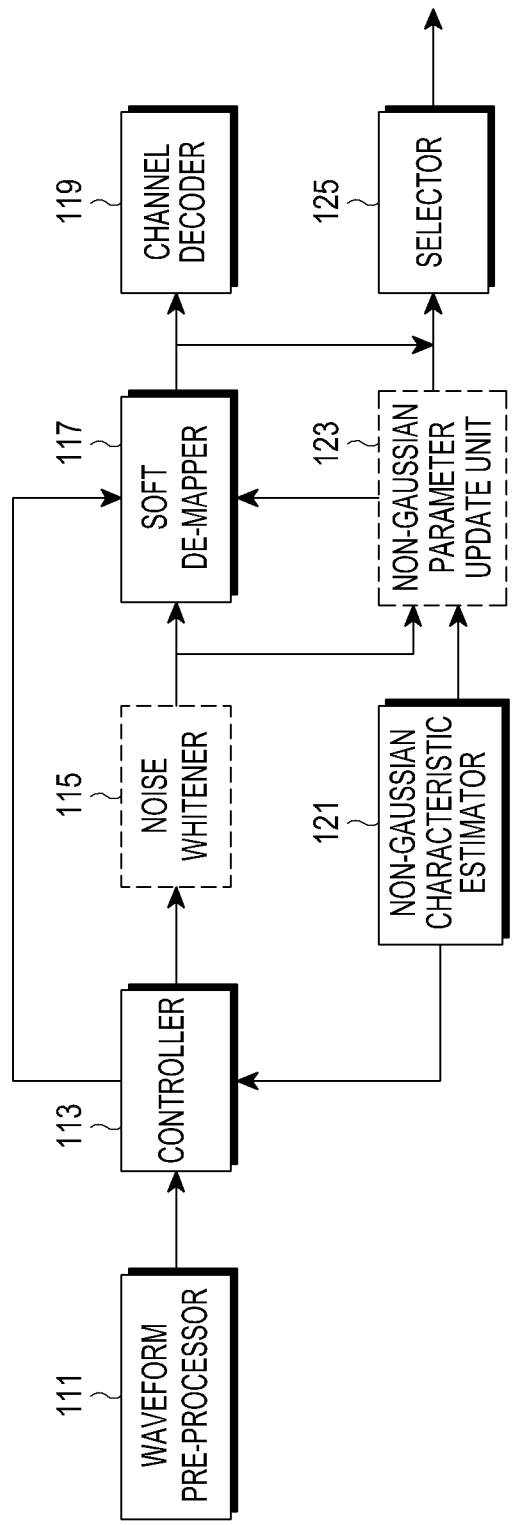
FIG. 1 illustrates an example of an internal structure of an apparatus for receiving a signal (or a signal receiving apparatus) in a multi-carrier communication system having a non-orthogonal waveform according to an embodiment of the present disclosure.

The following detailed description made referring to the accompanying drawings may help the comprehensive understanding of various embodiments of the present disclosure defined by claims and equivalents thereof. The following detailed description includes various specific details for understanding thereof, but these details will be regarded simply as examples. Therefore, those of ordinary skill in the art may recognize that various changes and modifications of various embodiments described herein may be made without departing from the scope and spirit of the present disclosure. In addition, a description of well-known functions and structures may be omitted for clarity and brevity.

Terms and words used in the following detailed description and claims are not limited to bibliographic meaning, but merely used by the inventor to enable a clear and consistent understanding of the present disclosure. Thus, it should be apparent to those of ordinary skill in the art that the following description of various embodiments of the present disclosure is provided merely for illustrative purposes, and not for purposes of limiting the present disclosure defined by the claims and their equivalents.

It is to be understood that the singular forms "a," "an," and "the" include plural referents unless the context clearly dictates otherwise. Thus, for example, a component surface includes one or more component surfaces.

Although the terms such as "first" and "second" used in the various exemplary embodiments of the present disclosure may modify various elements of the various exemplary embodiments, these terms do not limit the corresponding elements. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

The terms used in the various exemplary embodiments of the present disclosure are for the purpose of describing particular exemplary embodiments only and are not intended to be limiting. The singular forms are intended to include the plural forms as well, unless the context clearly indicates otherwise. The term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having meanings that are the same as or similar with the contextual meanings of the relevant technology.

An electronic device according to various embodiments of the present disclosure may be a device including a communication function. For example, an electronic device may include a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device (e.g., a head-mounted device (HMD)), electronic clothing, an electronic bracelet, an electronic necklace, an electronic appcessory, an electronic tattoo, or a smart watch.

According to various embodiments of the present disclosure, the electronic device may be a smart home appliance having a communication function. For example, the smart home appliance may include a TV, a digital video disk (DVD) player, audio equipment, a refrigerator, an air conditioner, a vacuum cleaner, an oven, a microwave oven, a washer, a drier, an air cleaner, a set-top box, a TV box (e.g., HomeSync™ of Samsung, TV™ of Apple, or TV™ of Google), a game console, an electronic dictionary, a camcorder, and an electronic frame.

According to various embodiments of the present disclosure, the electronic device may include medical equipment (e.g., a magnetic resonance angiography (MRA) device, a magnetic resonance imaging (MRI) device, a computed tomography (CT) device, an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system, gyroscope, and gyro compass for ships), avionics, a security device, an industrial or home robot, and so forth.

According to some embodiments, the electronic device may include a part of a furniture or building/structure having a communication function, an electronic board, an electronic signature receiving device, a projector, and various measuring instruments (for example, a water, electricity, gas, or electric wave measuring device).

The electronic device according to various embodiments of the present disclosure may be one of the above-listed devices or a combination thereof. It will be obvious to those of ordinary skill in the art that the electronic device according to various embodiments of the present disclosure is not limited to the above-listed devices.

According to various embodiments of the present disclosure, an apparatus for transmitting a signal (or a signal transmitting apparatus) may be a user equipment (UE) or a base station, for example, an evolved NodeB (eNB).

According to various embodiments of the present disclosure, an apparatus for receiving a signal (or a signal receiving apparatus) may be a UE or a base station, for example, an eNB.

In an embodiment of the present disclosure, the UE may be interchangeably used with a mobile station (MS), a terminal, a device, a wireless terminal, or the like.

In an embodiment of the present disclosure, the eNB may be interchangeably used with a node B, an access point (AP), or the like.

An embodiment of the present disclosure provides an apparatus and method for transmitting/receiving a signal in a multi-carrier communication system.

An embodiment of the present disclosure provides an apparatus and method for transmitting/receiving a signal in a multi-carrier communication system, by which reception complexity may be reduced.

An embodiment of the present disclosure provides an apparatus and method for transmitting/receiving a signal in a multi-carrier communication system, by which latency may be reduced.

An embodiment of the present disclosure provides an apparatus and method for transmitting/receiving a signal based on statistic characteristics of residual interference after equalization in a multi-carrier communication system.

An embodiment of the present disclosure provides an apparatus and method for transmitting/receiving a signal in a multi-carrier communication system, by which non-Gaussian characteristics may increase.

The apparatus and method proposed in the present disclosure are applicable to various communication systems such as a Long-Term Evolution (LTE) mobile communication system, an LTE-Advanced (LTE-A) mobile communication system, a License Assisted Access (LAA)-LTE mobile communication system, a high speed downlink packet access (HSDPA) mobile communication system, a high speed uplink packet access (HSUPA) mobile communication system, a high rate packet data (HRPD) mobile communication system of the 3GPP2, a wideband code division multiple access (WCDMA) mobile communication system of the 3GPP2, a code division multiple access (CDMA) mobile communication system of the 3GPP2, the Institute of Electrical and Electronics Engineers (IEEE) 802.16m communication system, an evolved packet system (EPS), a mobile Internet Protocol (IP) system, and so forth.

The present invention provides an apparatus for receiving a signal in a multi-carrier system, in which the apparatus includes a waveform pre-processor configured to perform, with respect to an input signal, waveform pre-processing based on at least one of equalization and filtering, a controller configured to check whether the waveform pre-processed signal is a Gaussian proximity signal, and a soft de-mapper configured to perform soft-de-mapping with respect to the waveform pre-processed signal based on a result of the checking.

In an embodiment of the present disclosure, the apparatus further includes a noise whitener configured to perform whitening with respect to the waveform pre-processed signal, when the waveform pre-processed signal is not the Gaussian proximity signal, in which the soft de-mapper is further configured to perform soft de-mapping with respect to the whitened signal based on a non-Gaussian parameter.

In an embodiment of the present disclosure, the non-Gaussian parameter includes at least one of a shape parameter and a scale parameter.

In an embodiment of the present disclosure, the soft de-mapper is further configured to perform soft de-mapping with respect to the whitened signal based on a non-Gaussian parameter, when the waveform pre-processed signal is the Gaussian proximity signal.

In an embodiment of the present disclosure, the non-Gaussian parameter includes at least one of a shape parameter and a scale parameter.

In an embodiment of the present disclosure, the soft de-mapper is further configured to perform soft de-mapping with respect to the waveform pre-processed signal, when the waveform pre-processed signal is not the Gaussian proximity signal, or to perform non-Gaussian soft de-mapping with respect to the waveform pre-processed signal, when the waveform pre-processed signal is the Gaussian proximity signal.

In an embodiment of the present disclosure, the soft de-mapper is further configured to perform soft de-mapping with respect to the waveform pre-processed signal based on non-Gaussian characteristics estimated based on a filter interference table.

In an embodiment of the present disclosure, the apparatus further includes a noise whitener configured to perform whitening with respect to the waveform pre-processed signal, when the waveform pre-processed signal is not the Gaussian proximity signal, in which the soft de-mapper is further configured to perform non-Gaussian soft de-mapping with respect to the whitened signal.

In an embodiment of the present disclosure, the soft de-mapper is further configured to perform soft de-mapping with respect to the whitened signal based on non-Gaussian characteristics estimated based on a filter interference table.

In an embodiment of the present disclosure, the soft de-mapper is further configured to perform soft de-mapping with respect to the waveform pre-processed signal based on a sum of interference and noise, when the waveform pre-processed signal is not the Gaussian proximity signal.

In an embodiment of the present disclosure, the apparatus further includes a noise whitener configured to perform whitening with respect to the waveform pre-processed signal when the waveform pre-processed signal is not the Gaussian proximity signal, in which the soft de-mapper is further configured to perform non-Gaussian soft de-mapping with respect to the whitened signal based on a sum of interference and noise. In an embodiment of the present disclosure, the soft de-mapper is further configured to perform soft de-mapping with respect to the waveform pre-processed signal based on a non-Gaussian parameter and a sum of interference and noise when the waveform pre-processed signal is not the Gaussian proximity signal.

In an embodiment of the present disclosure, the non-Gaussian parameter includes at least one of a shape parameter and a scale parameter.

In an embodiment of the present disclosure, the apparatus further includes a noise whitener configured to perform whitening with respect to the waveform pre-processed signal, when the waveform pre-processed signal is not the Gaussian proximity signal, in which the soft de-mapper is further configured to perform non-Gaussian soft de-mapping with respect to the whitened signal based on the non-Gaussian parameter and the sum of interference and noise.

In an embodiment of the present disclosure, the non-Gaussian parameter includes at least one of a shape parameter and a scale parameter.

First, in an embodiment of the present disclosure, in a multi-carrier communication system, statistic characteristics of residual interference after equalization are modeled and applied to a soft de-mapper that may affect an input value of a channel decoder, thereby improving reception performance of a signal receiving apparatus.

Herein, the soft de-mapper will be described in detail.

The soft de-mapper calculates reliability of a received signal based on probabilities from all possible transmission signals, directly affecting communication quality.

Assuming that an equalizer is perfectly implemented, an interference from a received signal may be regarded as being completely cancelled, and the received signal is assumed to have a Gaussian distribution. On such an assumption, a channel decoder calculates a log likelihood ratio (LLR).

However, for a sum of values of multiple random variables, which has a Gaussian distribution, a level of dependence between the values of the multiple random variables has to be low, and magnitudes of the values of the multiple random variables have to be the same as or at least similar to each other.

However, when a multi-carrier communication system has a non-orthogonal waveform, sub-carrier-specific residual interference after equalization and filtering is dependent on multiple adjacent sub-carriers and adjacent symbols due to filtering.

Meanwhile, filters designed to secure confinement of a spectrum have self-interference in terms of waveforms, and as a result, a self-signal-to-interference ratio (SIR) exists. The self-SIR is a fixed value for each filter, and is different from a signal-to-noise ratio (SNR) based on an instantaneously changing channel environment.

When a multi-filter bank is used, self-SIRs of filter banks may be different from each other. As such, sub-carrier-specific interference and noise including a sum of residual interferences and noises having different magnitudes inevitably have non-Gaussian characteristics. The non-Gaussian characteristics will be described in detail with reference to FIG. 11, and thus will not be described in detail.

Thus, an embodiment of the present disclosure proposes an apparatus and method for transmitting/receiving a signal based on non-Gaussian characteristics in a multi-carrier communication system having a non-orthogonal waveform.

Referring to FIG. 1, a description will be made of an example of an internal structure of a signal receiving apparatus in a multi-carrier communication system having a non-orthogonal waveform according to an embodiment of the present disclosure.

FIG. 1 is a block diagram illustrating an example of an internal structure of a signal receiving apparatus in a multi-carrier communication system having a non-orthogonal waveform according to an embodiment of the present disclosure.

Referring to FIG. 1, the signal receiving apparatus may include a waveform pre-processor 111, a controller 113, a noise whitener 115, a soft de-mapper 117, a channel decoder 119, a non-Gaussian characteristic estimator 121, a non-Gaussian parameter update unit 123, and a selector 125.

The waveform pre-processor 111 performs waveform pre-processing with respect to an input signal, and outputs the waveform-pre-processed signal to the controller 113. Herein, the waveform pre-processor 111 performs waveform pre-processing based on a multiplexing scheme used in a multi-carrier system supporting the non-orthogonal waveform, as will be described in more detail.

First, if for example, a quadrature amplitude modulation (QAM)-filter bank multi-carrier (FBMC) scheme is used in the multi-carrier system supporting the non-orthogonal waveform, the waveform pre-processor 111 performs equalization and then filtering with respect to a signal input to the waveform pre-processor 111 in a frequency domain.

If for example, an offset QAM (OQAM)-FBMC scheme is used in the multi-carrier system supporting the non-orthogonal waveform, the waveform pre-processor 111 performs equalization and then filtering with respect to the signal input to the waveform pre-processor 111 in the frequency domain, and then perform the filtering and obtains a real value.

If for example, a general frequency division multiplexing (GFDM) scheme is used in the multi-carrier system supporting the non-orthogonal waveform, the waveform pre-processor 111 performs equalization and then filtering with respect to the signal input to the waveform pre-processor 111 in the frequency domain, like in the QAM-FBMC scheme.

Meanwhile, the controller 113 checks if the waveform pre-processed signal output from the waveform pre-processor 111 is a Gaussian proximity signal based on non-Gaussian characteristics output from the non-Gaussian characteristic estimator 121. Non-Gaussian characteristic estimation performed by the non-Gaussian characteristic estimator 121 will later be described in more detail, and thus will not be described at this time.

If the waveform pre-processed signal output from the waveform pre-processor 111 is not a Gaussian proximity signal as a result of checking, the controller 113 outputs the waveform pre-processed signal output from the waveform pre-processor 111 to the noise whitener 115. The controller 113 outputs the waveform pre-processed signal to the soft de-mapper 117 if the waveform pre-processed signal output from the waveform pre-processor 111 is a Gaussian proximity signal as a result of checking.

The controller 113 checks if the signal is a Gaussian proximity signal to prevent an unnecessary operation if the signal is a Gaussian proximity signal.

Herein, an operation of the controller 113 to check whether the signal is a Gaussian proximity signal will be described in detail.

First, if a random signal has a Gaussian distribution, both a skewness corresponding to a third-order moment of the random signal and a kurtosis corresponding to a fourth-order moment of the random signal are equal to 0.

An entropy of the Gaussian distribution goes to infinity, and for a neg-entropy including a difference between the entropy of the Gaussian distribution and an entropy of a signal of interest, the neg-entropy is equal to 0 if the signal of interest has Gaussian distribution.

If the signal is modeled to complex general Gaussian (CGG) distribution, a value of a shape parameter that determines a shape of the CGG distribution is equal to 2.

Thus, a degree of the non-Gaussian distribution may be determined based on a difference between a non-Gaussian measured parameter and a Gaussian parameter. To determine a difference between the non-Gaussian measured parameter and the Gaussian parameter, a threshold value may be used and may be eventually determined based on a performance increase when a non-Gaussian de-mapper is used in comparison to when a Gaussian soft de-mapper is used.

Performance of the Gaussian soft de-mapper is directly affected by a SIR of an input signal, and therefore, the threshold value is initially set to a default threshold value, and is changed based on performance improvement obtained by the non-Gaussian soft de-mapper.

For example, if noise is in a critical situation, a Gaussian soft de-mapper may be used; if an interference signal is relatively large, a non-Gaussian soft de-mapper may be selectively used based on a non-Gaussian level of the interference signal. Thus, if an SIR is less than an SNR, that is, interference is large, the threshold value is reduced to increase a probability that the non-Gaussian de-mapper is selected. Herein, the threshold value may be reduced by a preset step value.

In another example, since the complexity of the non-Gaussian soft de-mapper is higher than that of the Gaussian soft de-mapper, the threshold value may increase according to requirements of the complexity of the signal receiving apparatus.

An operation of the controller 113 to output the waveform pre-processed signal output from the waveform pre-processor 111 to the noise whitener 115 will be described below.

First, the noise whitener 115 performs whitening with respect to a signal output from the controller 113 in the frequency domain, and outputs the whitened signal to the soft de-mapper 117 and the non-Gaussian parameter update unit 123. Herein, the noise whitener 115 may perform whitening in the frequency domain with respect to noise whose sub-carrier-specific characteristics are changed due to equalization and filtering performed by the waveform pre-processor 111, such that the sub-carrier-specific characteristics are the same.

calculate the shape parameter based on a filter-specific interference table output from the non-Gaussian characteristic estimator 121 and the SNR.

The filter-specific interference table is, for example, as shown in Table 1.

TABLE 1

| sub-ch. | time | | | | | | | | |
|---|---|---|---|---|---|---|---|---|---|
| | −4 | −3 | −2 | −1 | 0 | 1 | 2 | 3 | 4 |
| −2 | 0 | 0.0006 | −0.0001 | 0 | 0 | 0 | −0.0001 | 0.0006 | 0 |
| −1 | 0.0054 | j.0429 | −0.1250 | −j.2058 | 0.2393 | j.2058 | −0.1250 | −j.0429 | 0.0054 |
| 0 | 0 | −0.0668 | 0.0002 | 0.5644 | 1 | 0.5644 | 0.0002 | −0.0668 | 0 |
| 1 | 0.0054 | −j.0429 | −0.1250 | j.2058 | 0.2393 | −j.2058 | −0.1250 | j.0.429 | 0.0054 |
| 2 | 0 | 0.0006 | −0.0001 | 0 | 0 | 0 | −0.0001 | 0.0006 | 0 |

The noise whitener 115 performs whitening in the frequency domain, such that when statistic characteristics of residual interference are modeled and the modeled statistic characteristics are used, the same characteristics may be provided for each sub-carrier.

The soft de-mapper 117 may operate as a Gaussian soft de-mapper or a non-Gaussian soft de-mapper, and in this case, the soft de-mapper 117 operates as a Gaussian soft de-mapper. The soft de-mapper 117 performs soft de-mapping with respect to the signal output from the noise whitener 115 based on at least one of a shape parameter and a scale parameter that are output from the non-Gaussian parameter update unit 123, and outputs the soft-de-mapped signal to the channel decoder 119 and the selector 125. Herein, the shape parameter indicates a parameter modeling the non-Gaussian characteristics. The scale parameter corresponds to magnitudes of noise and interference, and may be adjusted according to a given shape parameter. Generation of the shape parameter and the scale parameter by the non-Gaussian parameter update unit 123 will be described in more detail, and thus will not be described at this time.

When the soft de-mapper 117 performs soft de-mapping based on log-max approximation, the soft de-mapper 117 may perform soft de-mapping based on the shape parameter, and thus does not need an additional parameter other than the shape parameter.

On the other hand, when the soft de-mapper 117 does not perform soft de-mapping based on log-max approximation, the soft de-mapper 117 may not be able to perform soft de-mapping based on only the shape parameter. Thus, the soft de-mapper 117 needs an additional parameter other than the shape parameter, that is, the scale parameter. Herein, the scale parameter may be estimated based on the shape parameter and first-order statistic characteristics of an absolute value of interference. To estimate the scale parameter based on the first-order statistic characteristics of the absolute value of interference, an operation of estimating a transmission signal or information about a reference signal, for example, a pilot signal is needed.

The channel decoder 119 performs channel decoding with respect to a signal output from the soft de-mapper 117.

Meanwhile, an operation of the non-Gaussian parameter update unit 123 to update non-Gaussian parameters will be described in detail.

When the non-Gaussian characteristics are modeled to a CGG distribution, the shape parameter and the scale parameter are required. As discussed above, since a difference between the self-SIR and the SNR of the filter is the most important to modeling of non-Gaussian characteristics, the non-Gaussian parameter update unit 123 may previously The non-Gaussian characteristic estimator 121 models a sum of new interference and noise by applying an interference parameter as a weight value to an interference signal based on an interference table in adjacent frequency domain and time domain generated for each filter, and previously calculates the shape parameter based on the first-order statistic characteristics and second-order statistic characteristics of an absolute value of a sum of the interference and noise. Herein, the interference signal indicates a signal modulated at random by using a modulation scheme applied to the input signal.

In an embodiment of the present disclosure, a description has been made by using an example where the non-Gaussian characteristic estimator 121 calculates a non-Gaussian parameter based on a moment matching method, and the non-Gaussian characteristic estimator 121 may also calculate the non-Gaussian parameter by using a method other than the moment matching method.

In particular, since the non-Gaussian characteristic estimator 121 is not generated based on a channel in an embodiment of the present disclosure, the non-Gaussian characteristic estimator 121 may calculate the non-Gaussian parameter in advance based on the filter-specific interference table and the SNR. On the other hand, in an embodiment of the present disclosure, if there is only filter-caused interference, a non-Gaussian soft de-mapper may be used based on an output of a non-Gaussian characteristic estimator without updating non-Gaussian parameters.

Meanwhile, when an interference situation is changed, for example, multi-cell or multi-user interference occurs, the non-Gaussian parameter update unit 123 may update a non-Gaussian parameter based on a received signal and an estimated transmission signal (or pilot signal). That is, the interference signal may be generated by removing the transmission signal from the received signal, and may be used to estimate a non-Gaussian parameter by using moment matching or other methods. When the non-Gaussian parameter is estimated in a repeated manner, an initial value of the non-Gaussian parameter is set based on a non-Gaussian parameter provided by the non-Gaussian characteristic estimator 121, and the non-Gaussian parameter is updated.

If the signal receiving apparatus uses multiple filter banks, non-Gaussian characteristics of interference may increase if a self-SIR differs from filter bank to filter bank. Thus, to use such characteristics, it may be more desirable to transmit channel-encoded data through multiple filter banks in a distributed manner than to apply channel encoding to each filter bank.

Thus, the selector 125 determines channel quality information for each filter group corresponding to the same channel encoding block, for example, a channel quality indicator (CQI), mutual information, and so forth, instead of differently applying channel encoding to each filter bank. The selector 125 selects a channel encoding block filter to which channel encoding is to be equally applied, and generates information about the selected channel encoding block filter as feedback information. That is, the feedback information includes information about a channel encoding block filter group and channel quality information of the channel encoding block filter group. The feedback information is transmitted to a signal transmitting apparatus corresponding to the signal receiving apparatus through a transmitter (not separately shown in FIG. 1).

The signal transmitting apparatus then determines a channel encoding block suitable for the signal receiving apparatus based on the feedback information. In this way, by selecting, by the signal transmitting apparatus, a channel encoding block to be transmitted to the signal receiving apparatus based on the feedback information, a data rate of the multi-carrier communication system may be improved.

Although it is illustrated in FIG. 1 that the signal receiving apparatus is implemented with separate units such as the waveform pre-processor 111, the controller 113, the noise whitener 115, the soft de-mapper 117, the channel decoder 119, the non-Gaussian characteristic estimator 121, the non-Gaussian parameter update unit 123, and the selector 125, the signal receiving apparatus may be implemented in such a way that at least two of the waveform pre-processor 111, the controller 113, the noise whitener 115, the soft de-mapper 117, the channel decoder 119, the non-Gaussian characteristic estimator 121, the non-Gaussian parameter update unit 123, and the selector 125 are integrated. The signal receiving apparatus may be implemented with one processor or one chipset.

A description has been made of an example of the internal structure of the signal receiving apparatus in the multi-carrier communication system having the non-orthogonal waveform according to an embodiment of the present disclosure with reference to FIG. 1, and next, referring to FIG. 2, a description will be made of an internal structure of the non-Gaussian parameter update unit included in the signal receiving apparatus in the multi-carrier communication system having the non-orthogonal waveform according to an embodiment of the present disclosure.

Figure 2:
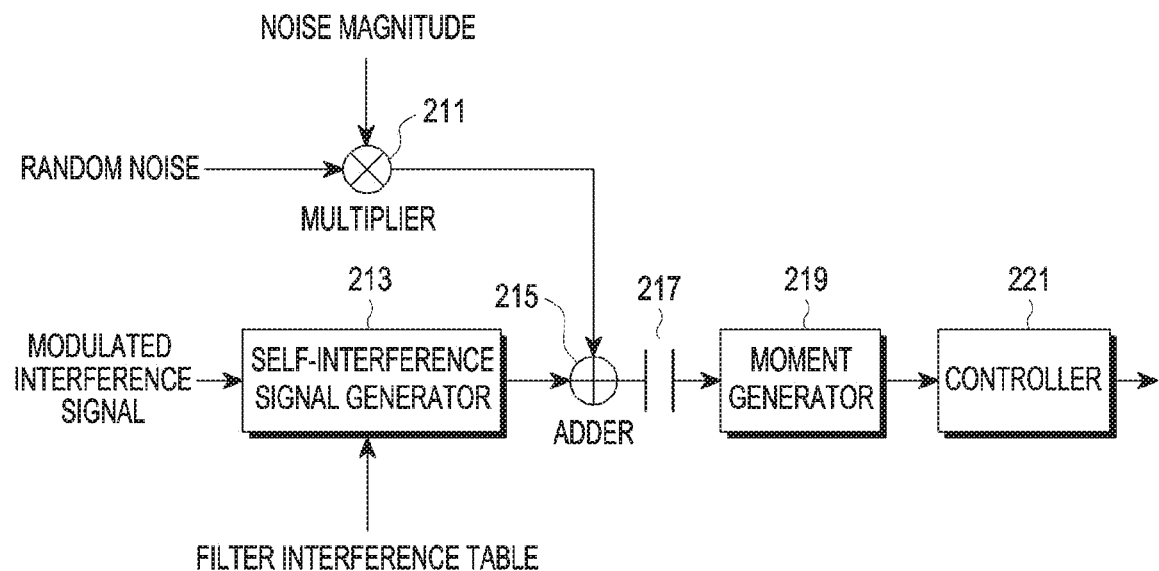
FIG. 2 illustrates an internal structure of a non-Gaussian characteristic estimator included in a signal receiving apparatus in a multi-carrier communication system having a non-orthogonal waveform according to an embodiment of the present disclosure.

FIG. 2 illustrates an internal structure of a non-Gaussian characteristic estimator included in a signal receiving apparatus in a multi-carrier communication system having a non-orthogonal waveform according to an embodiment of the present disclosure.

Referring to FIG. 2, the non-Gaussian characteristic estimator may include a multiplier 211, a self-interference signal generator 213, an adder 215, an absolute value detector 217, a moment generator 219, and a controller 221.

First, for a non-orthogonal waveform, self-interference of a filter occurs, an influence of an adjacent sub-carrier or an adjacent symbol may be detected based on an interference table of a filter (or a filter interference table) in addition to a self-SIR. The filter interference table is as described in Table 1, and thus will not be described in detail.

Thus, if the filter interference table and the modulation scheme are known, self-interference of the filter may be reproduced, and a signal corresponding to interference and noise may be generated by adding the interference and the noise according to a noise level.

Entropy or neg-entropy based on moment or empirical distribution may be generated based on the signal corresponding to the noise and the interference, and the entropy or neg-entropy based on the moment or empirical distribution may be used as a parameter of a non-Gaussian soft de-mapper as well as a parameter for measuring a non-Gaussian level.

For example, when an interference signal is modeled to a CGG distribution, two parameters, that is, a shape parameter that determines a shape of a distribution and a scale parameter that determines a level of noise and interference are needed. There may be various schemes for estimating the shape parameter and the scale parameter, and a relatively simple scheme among the schemes estimates the shape parameter based on first-order moment and second-order moment of an absolute value of interference and estimates the scale parameter based on the first-order moment of the absolute value of interference and the estimated parameter. Herein, the scale parameter is associated with magnitudes of interference and noise, and needs to be updated each time when the magnitudes of interference and noise are changed. The shape parameter determines characteristics of interference, and may be determined by a ratio of the magnitudes of interference and noise and a type of interference rather than by the magnitudes of interference and noise.

Thus, when other interference such as multi-cell interference or multi-user interference than self-interference caused by the filter occurs additionally, the shape parameter needs to be updated. For example, when a difference between a default SIR of a shape parameter determined initially offline and an SNR increases like when the difference reaches an interference amount or becomes ignorable relative to the interference amount, then the shape parameter needs to be updated. A modulation and coding scheme (MCS) level is determined, and when another interference factor is not generated within an operating range of the determined MCS level, the shape parameter does not change largely.

Referring back to FIG. 2, in the non-Gaussian characteristic estimator, random noise is multiplied by a magnitude of noise by the multiplier 211 and then is output to the adder 215. The modulated interference signal is input to the self-interference signal generator 213, and the self-interference signal generator 213 generates a self-interference signal of the filter based on the filter interference table and outputs the self-interference signal of the filter to the adder 215.

The adder 215 adds the noise output from the multiplier 211 and the self-interference of the filter output from the self-interference signal generator 213, and outputs the added value to the absolute value detector 217.

The absolute value detector 217 detects an absolute value of the value output from the adder 215 and outputs the detected absolute value to the moment generator 219.

The moment generator 219 generates a first-order moment and a second-order moment of the signal output from the absolute value detector 217, and outputs the generated first-order moment and second-order moment to the controller 221.

The controller 221 estimates the shape parameter based on the first moment and the second moment, and estimates the scale parameter based on the first-order moment and the estimated shape parameter. Herein, the scale parameter is associated with magnitudes of interference and noise, and needs to be updated each time when the magnitudes of interference and noise are changed. The shape parameter determines characteristics of interference, and may be determined by a ratio of the magnitudes of interference and noise and a type of interference rather than by the magnitudes of interference and noise. Thus, when other interference such as multi-cell interference or multi-user interference than self-interference caused by the filter occurs additionally, the shape parameter needs to be updated.

Meanwhile, it has been described with reference to FIG. 2 that the non-Gaussian characteristic estimator calculates a non-Gaussian parameter based on a moment matching method, but the non-Gaussian characteristic estimator may also calculate the non-Gaussian parameter by using a method other than the moment matching method.

Although it is illustrated in FIG. 2 that the non-Gaussian characteristic estimator is implemented with separate units such as the multiplier 211, the self-interference signal generator 213, the adder 215, the absolute value detector 217, the moment generator 219, and the controller 221, the non-Gaussian characteristic estimator may be implemented in such a way that at least two of the multiplier 211, the self-interference signal generator 213, the adder 215, the absolute value detector 217, the moment generator 219, and the controller 221 are integrated. The non-Gaussian characteristic estimator may be implemented with one processor or one chipset.

Although not shown as separate drawings, the non-Gaussian parameter update unit considers a difference between an interference signal and a received signal/a transmission signal (or an already known reference signal, for example, a pilot signal or a detected signal), thereby taking multi-cell or multi-user interference as well as filter-caused self-interference into account.

That is, the non-Gaussian parameter update unit estimates a non-Gaussian parameter based on a difference between a signal output from the noise whitener 115 and a transmission signal, without the multiplier 211, the self-interference signal generator 213, and the adder 215 included in the non-Gaussian characteristic estimator. When the non-Gaussian parameter update unit uses a moment matching method, the non-Gaussian parameter update unit may include the absolute value detector 217 and the moment generator 219.

Figure 3:
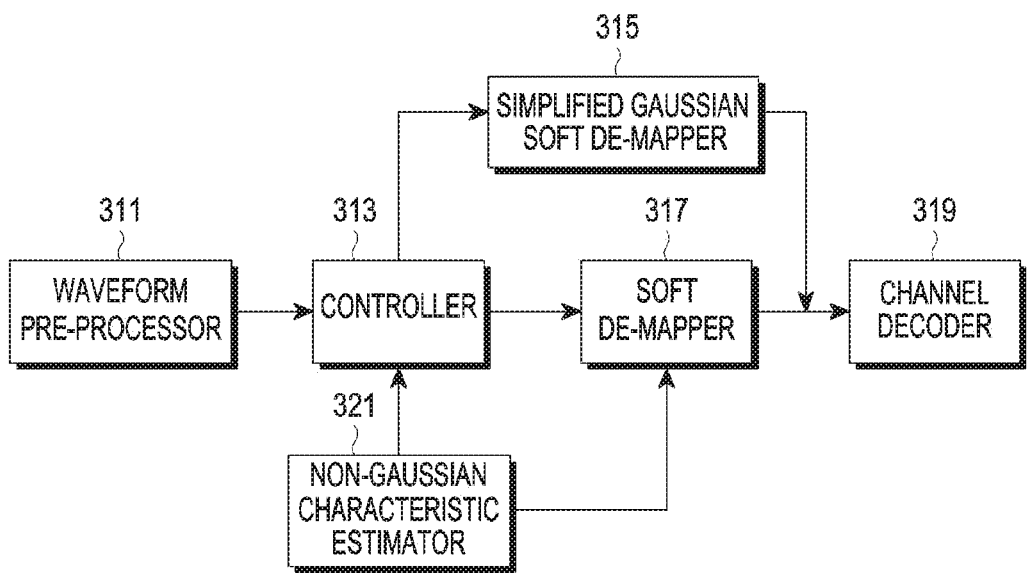
FIG. 3 illustrates another example of an internal structure of a signal receiving apparatus in a multi-carrier communication system having a non-orthogonal waveform according to an embodiment of the present disclosure.

With reference to FIG. 3, a description will be made of another example of the internal structure of the signal receiving apparatus in the multi-carrier communication system having the non-orthogonal waveform according to an embodiment of the present disclosure.

FIG. 3 illustrates another example of an internal structure of a signal receiving apparatus in a multi-carrier communication system having a non-orthogonal waveform according to an embodiment of the present disclosure.

Referring to FIG. 3, the signal receiving apparatus may include a waveform pre-processor 311, a controller 313, a simplified Gaussian soft de-mapper 315, a soft de-mapper 317, a channel decoder 319, and a non-Gaussian characteristic estimator 321.

The waveform pre-processor 311 performs waveform pre-processing with respect to an input signal, and outputs the waveform-pre-processed signal to the controller 313. Herein, the waveform pre-processor 311 performs waveform pre-processing based on a multiplexing scheme used in a multi-carrier system supporting the non-orthogonal waveform. An operation of the waveform pre-processor 311 is the same as those described above with reference to FIG. 1, and thus will not be described in detail at this time.

Meanwhile, the controller 313 checks if the waveform pre-processed signal output from the waveform pre-processor 311 is a Gaussian proximity signal based on non-Gaussian characteristics output from the non-Gaussian characteristic estimator 321. Non-Gaussian characteristic estimation performed by the non-Gaussian characteristic estimator 321 is the same as described with reference to FIG. 1, and thus will not be described in detail at this time.

If the waveform pre-processed signal output from the waveform pre-processor 311 is not a Gaussian proximity signal as a result of checking, the controller 313 outputs the waveform pre-processed signal output from the waveform pre-processor 311 to the soft de-mapper 317. The controller 313 outputs the waveform pre-processed signal to the simplified Gaussian soft de-mapper 315 if the waveform pre-processed signal output from the waveform pre-processor 311 is a Gaussian proximity signal as a result of checking.

When the controller 313 outputs the waveform pre-processed signal output from the waveform pre-processor 311 to the soft de-mapper 317, the soft de-mapper 317 performs soft de-mapping with respect to a signal output from the controller 313 based on a filter-specific interference table output from the non-Gaussian characteristic estimator 321 and the SNR, and then outputs the soft-de-mapped signal to the channel decoder 319. The filter-specific interference table is similar with Table 1, and thus will not be described in detail.

The channel decoder 319 performs channel decoding with respect to a signal output from the soft de-mapper 317.

When the controller 313 outputs the waveform pre-processed signal output from the waveform pre-processor 311 to the simplified Gaussian soft de-mapper 315, the simplified Gaussian soft de-mapper 315 performs simplified Gaussian soft de-mapping with respect to a signal output from the controller 313, and then outputs the simplified Gaussian soft-de-mapped signal to the channel decoder 319. Hereinbelow, in an embodiment of the present disclosure, simplified Gaussian soft de-mapping is assumed to be any one of Gaussian soft de-mapping and Gaussian soft de-mapping including operations, some of which are omitted.

The channel decoder 319 performs channel decoding with respect to a signal output from the soft de-mapper 317.

Although it is illustrated in FIG. 3 that the signal receiving apparatus is implemented with separate units such as the waveform pre-processor 311, the controller 313, the simplified Gaussian soft de-mapper 315, the soft de-mapper 317, the channel decoder 319, and the non-Gaussian characteristic estimator 321, the signal receiving apparatus may be implemented in such a way that at least two of the waveform pre-processor 311, the controller 313, the simplified Gaussian soft de-mapper 315, the soft de-mapper 317, the channel decoder 319, and the non-Gaussian characteristic estimator 321 are integrated. The signal receiving apparatus may be implemented with one processor or one chipset.

A description has been made of another example of the internal structure of the signal receiving apparatus in the multi-carrier communication system having the non-orthogonal waveform according to an embodiment of the present disclosure with reference to FIG. 3, and next, referring to FIG. 4, a description will be made of another example of the internal structure of the signal receiving apparatus in the multi-carrier communication system having the non-orthogonal waveform according to an embodiment of the present disclosure.

Figure 4:
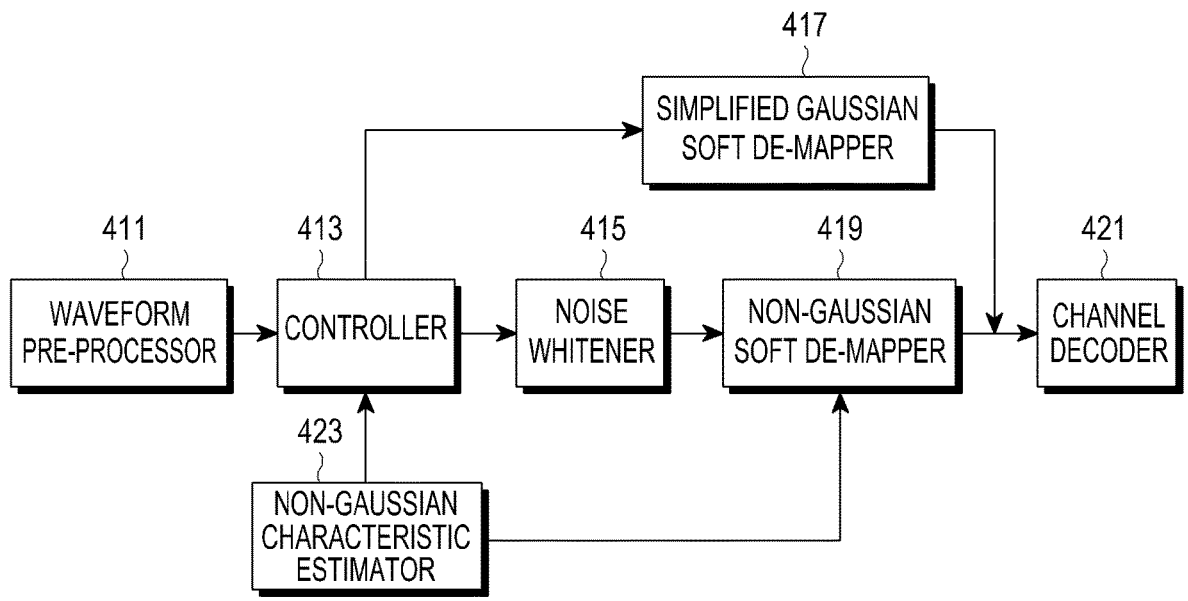
FIG. 4 illustrates another example of an internal structure of a signal receiving apparatus in a multi-carrier communication system having a non-orthogonal waveform according to an embodiment of the present disclosure.

FIG. 4 illustrates another example of an internal structure of a signal receiving apparatus in a multi-carrier communication system having a non-orthogonal waveform according to an embodiment of the present disclosure.

Referring to FIG. 4, the signal receiving apparatus may include a waveform pre-processor 411, a controller 413, a noise whitener 415, a simplified Gaussian soft de-mapper 117, a non-Gaussian soft de-mapper 419, a channel decoder 421, and a non-Gaussian characteristic estimator 423.

The waveform pre-processor 411 performs waveform pre-processing with respect to an input signal, and outputs the waveform-pre-processed signal to the controller 413. Herein, the waveform pre-processor 411 performs waveform pre-processing based on a multiplexing scheme used in a multi-carrier system supporting the non-orthogonal waveform. An operation of the waveform pre-processor 411 is the same as those described above with reference to FIG. 1, and thus will not be described in detail at this time.

Meanwhile, the controller 413 checks if the waveform pre-processed signal output from the waveform pre-processor 411 is a Gaussian proximity signal based on non-Gaussian characteristics output from the non-Gaussian characteristic estimator 423. Non-Gaussian characteristic estimation performed by the non-Gaussian characteristic estimator 423 is the same as described with reference to FIG. 1, and thus will not be described in detail at this time.

If the waveform pre-processed signal output from the waveform pre-processor 411 is not a Gaussian proximity signal as a result of checking, the controller 413 outputs the waveform pre-processed signal output from the waveform pre-processor 311 to the interference whitener 415.

First, the noise whitener 415 performs whitening with respect to a signal output from the controller 413 in the frequency domain, and outputs the whitened signal to the non-Gaussian soft de-mapper 419. Herein, the noise whitener 415 may perform whitening in the frequency domain with respect to noise whose sub-carrier-specific characteristics are changed due to equalization and filtering performed by the waveform pre-processor 411, such that the sub-carrier-specific characteristics are the same. A detailed operation of the noise whitener 415 is the same as those described above with reference to FIG. 1, and thus will not be described in detail at this time.

The signal whitened by the noise whitener 415 is output to the non-Gaussian soft de-mapper 419 which then performs non-Gaussian soft de-mapping with respect to the whitened signal output from the noise whitener 415 based on the filter-specific interference table output from the non-Gaussian characteristic estimator 423 and the SNR and then outputs the non-Gaussian soft-de-mapped signal to the channel decoder 421. The filter-specific interference table is similar with Table 1, and thus will not be described in detail.

The channel decoder 421 performs channel decoding with respect to a signal output from the non-Gaussian soft de-mapper 419.

When the controller 413 outputs the waveform pre-processed signal output from the waveform pre-processor 411 to the simplified Gaussian soft de-mapper 417, the simplified Gaussian soft de-mapper 417 performs simplified Gaussian soft de-mapping with respect to a signal output from the controller 413, and then outputs the simplified Gaussian soft-de-mapped signal to the channel decoder 421.

The channel decoder 421 performs channel decoding with respect to the signal output from the simplified Gaussian soft de-mapper 417.

Although it is illustrated in FIG. 4 that the signal receiving apparatus is implemented with separate units such as the waveform pre-processor 411, the controller 413, the noise whitener 415, the simplified Gaussian soft de-mapper 417, the non-Gaussian soft de-mapper 419, the channel decoder 421, and the non-Gaussian characteristic estimator 423, the signal receiving apparatus may be implemented in such a way that at least two of the waveform pre-processor 411, the controller 413, the noise whitener 415, the simplified Gaussian soft de-mapper 417, the non-Gaussian soft de-mapper 419, the channel decoder 421, and the non-Gaussian characteristic estimator 423 are integrated. The signal receiving apparatus may be implemented with one processor or one chipset.

A description has been made of another example of the internal structure of the signal receiving apparatus in the multi-carrier communication system having the non-orthogonal waveform according to an embodiment of the present disclosure with reference to FIG. 4, and next, referring to FIG. 5, a description will be made of another example of the internal structure of the signal receiving apparatus in the multi-carrier communication system having the non-orthogonal waveform according to an embodiment of the present disclosure.

Figure 5:
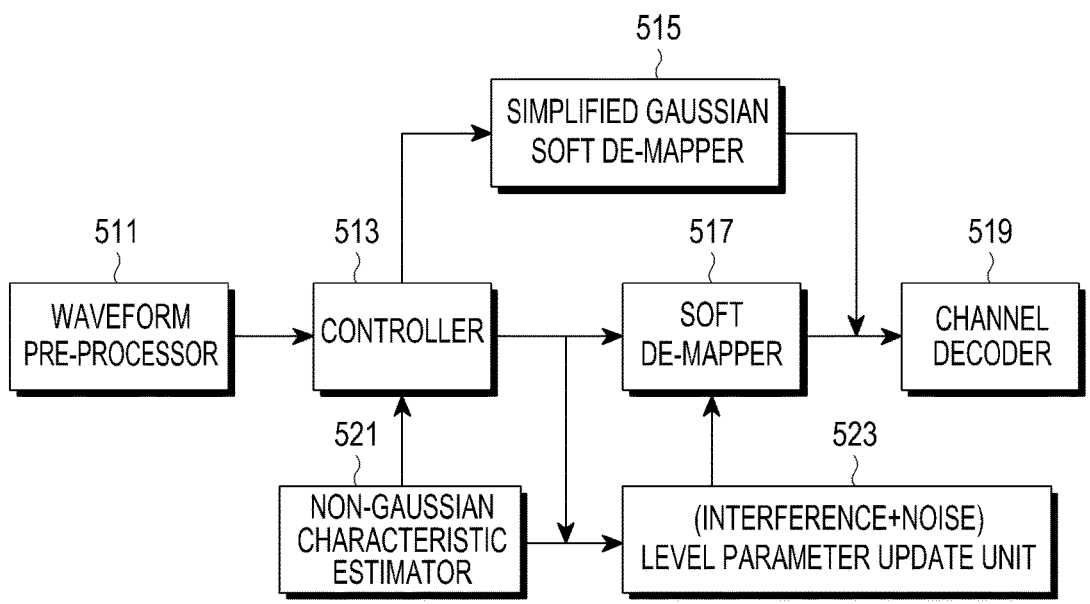
FIG. 5 illustrates another example of an internal structure of a signal receiving apparatus in a multi-carrier communication system having a non-orthogonal waveform according to an embodiment of the present disclosure.

FIG. 5 illustrates another example of an internal structure of a signal receiving apparatus in a multi-carrier communication system having a non-orthogonal waveform according to an embodiment of the present disclosure.

Referring to FIG. 5, the signal receiving apparatus may include a waveform pre-processor 511, a controller 513, a simplified Gaussian soft de-mapper 515, a soft de-mapper 517, a channel decoder 519, a non-Gaussian characteristic estimator 521, and an (interference+noise) (or interference plus noise) level parameter update unit 523.

The waveform pre-processor 511 performs waveform pre-processing with respect to an input signal, and outputs the waveform-pre-processed signal to the controller 513. Herein, the waveform pre-processor 511 performs waveform pre-processing based on a multiplexing scheme used in a multi-carrier system supporting the non-orthogonal waveform. An operation of the waveform pre-processor 511 is the same as those described above with reference to FIG. 1, and thus will not be described in detail at this time.

Meanwhile, the controller 513 checks if the waveform pre-processed signal output from the waveform pre-processor 511 is a Gaussian proximity signal based on non-Gaussian characteristics output from the non-Gaussian characteristic estimator 521. Non-Gaussian characteristic estimation performed by the non-Gaussian characteristic estimator 521 is the same as described with reference to FIG. 1, and thus will not be described in detail at this time.

If the waveform pre-processed signal output from the waveform pre-processor 511 is not a Gaussian proximity signal as a result of checking, the controller 513 outputs the waveform pre-processed signal output from the waveform pre-processor 511 to the soft de-mapper 517 and the (interference+noise) level parameter update unit 523.

The controller 513 outputs the waveform pre-processed signal to the simplified Gaussian soft de-mapper 515 if the waveform pre-processed signal output from the waveform pre-processor 511 is a Gaussian proximity signal as a result of checking.

When the controller 513 outputs the waveform pre-processed signal output from the waveform pre-processor 511 to the soft de-mapper 517, the soft de-mapper 517 performs soft de-mapping with respect to a signal output from the controller 513 based on an (interference+noise) level parameter output from the (interference+noise) level parameter update unit 523, and then outputs the soft-de-mapped signal to the channel decoder 519. An operation of the (interference+noise) level parameter update unit 523 is the same as those described above with reference to FIGS. 1 and 2, and thus will not be described in detail at this time.

The channel decoder 519 performs channel decoding with respect to a signal output from the soft de-mapper 517.

When the controller 513 outputs the waveform pre-processed signal output from the waveform pre-processor 511 to the simplified Gaussian soft de-mapper 515, the simplified Gaussian soft de-mapper 515 performs simplified Gaussian soft de-mapping with respect to a signal output from the controller 513, and then outputs the simplified Gaussian soft-de-mapped signal to the channel decoder 519.

The channel decoder 519 performs channel decoding with respect to a signal output from the soft de-mapper 517.

Although it is illustrated in FIG. 5 that the signal receiving apparatus is implemented with separate units such as the waveform pre-processor 511, the controller 513, the simplified Gaussian soft de-mapper 515, the soft de-mapper 517, the channel decoder 519, the non-Gaussian characteristic estimator 521, and the (interference+noise) level parameter update unit 523, the signal receiving apparatus may be implemented in such a way that at least two of the waveform pre-processor 511, the controller 513, the simplified Gaussian soft de-mapper 515, the soft de-mapper 517, the channel decoder 519, the non-Gaussian characteristic estimator 521, and the (interference+noise) level parameter update unit 523 are integrated. The signal receiving apparatus may be implemented with one processor or one chipset.

A description has been made of another example of the internal structure of the signal receiving apparatus in the multi-carrier communication system having the non-orthogonal waveform according to an embodiment of the present disclosure with reference to FIG. 5, and next, referring to FIG. 6, a description will be made of another example of the internal structure of the signal receiving apparatus in the multi-carrier communication system having the non-orthogonal waveform according to an embodiment of the present disclosure.

Figure 6:
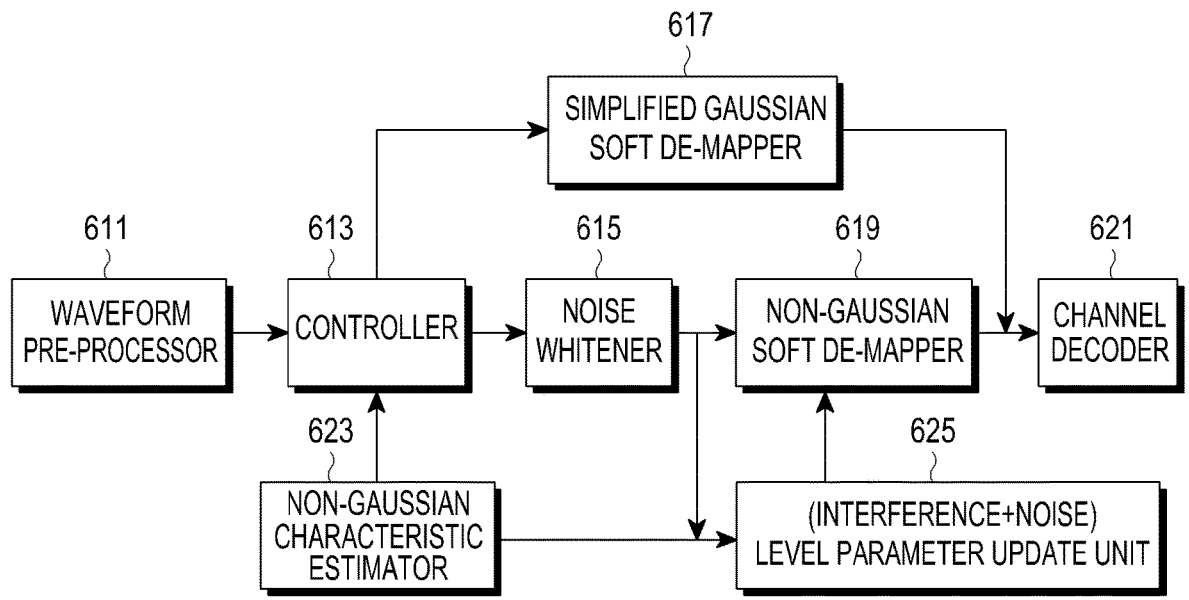
FIG. 6 illustrates another example of an internal structure of a signal receiving apparatus in a multi-carrier communication system having a non-orthogonal waveform according to an embodiment of the present disclosure.

FIG. 6 illustrates another example of an internal structure of a signal receiving apparatus in a multi-carrier communication system having a non-orthogonal waveform according to an embodiment of the present disclosure.

Referring to FIG. 6, the signal receiving apparatus may include a waveform pre-processor 611, a controller 613, a noise whitener 615, a simplified Gaussian soft de-mapper 617, a non-Gaussian soft de-mapper 619, a channel decoder 621, a non-Gaussian characteristic estimator 623, and an (interference+noise) level parameter update unit 625.

The waveform pre-processor 611 performs waveform pre-processing with respect to an input signal, and outputs the waveform-pre-processed signal to the controller 613. Herein, the waveform pre-processor 611 performs waveform pre-processing based on a multiplexing scheme used in a multi-carrier system supporting the non-orthogonal waveform. An operation of the waveform pre-processor 611 is the same as those described above with reference to FIG. 1, and thus will not be described in detail at this time.

Meanwhile, the controller 613 checks if the waveform pre-processed signal output from the waveform pre-processor 611 is a Gaussian proximity signal based on non-Gaussian characteristics output from the non-Gaussian characteristic estimator 623. Non-Gaussian characteristic estimation performed by the non-Gaussian characteristic estimator 623 is the same as described with reference to FIG. 1, and thus will not be described in detail at this time.

If the waveform pre-processed signal output from the waveform pre-processor 611 is not a Gaussian proximity signal as a result of checking, the controller 613 outputs the waveform pre-processed signal output from the waveform pre-processor 611 to the noise whitener 615.

First, the noise whitener 615 performs whitening with respect to a signal output from the controller 613 in the frequency domain, and outputs the whitened signal to the soft de-mapper 619 and the (interference+noise) level parameter update unit 625. Herein, the noise whitener 615 may perform whitening in the frequency domain with respect to noise whose sub-carrier-specific characteristics are changed due to equalization and filtering performed by the waveform pre-processor 611, such that the sub-carrier-specific characteristics are the same. A detailed operation of the noise whitener 615 is the same as those described above with reference to FIG. 1, and thus will not be described in detail at this time.

The signal whitened by the noise whitener 615 is output to the non-Gaussian soft de-mapper 619 which then performs non-Gaussian soft de-mapping with respect to the whitened signal output from the noise whitener 615 based on an (interference+noise) level parameter output from the (interference+noise) level parameter update unit 625 and the SNR and then outputs the non-Gaussian soft-de-mapped signal to the channel decoder 621. An operation of the (interference+noise) level parameter update unit 625 is the same as those described above with reference to FIGS. 1 and 2, and thus will not be described in detail at this time.

The channel decoder 621 performs channel decoding with respect to a signal output from the non-Gaussian soft de-mapper 619.

When the controller 613 outputs the waveform pre-processed signal output from the waveform pre-processor 611 to the simplified Gaussian soft de-mapper 617, the simplified Gaussian soft de-mapper 617 performs simplified Gaussian soft de-mapping with respect to a signal output from the controller 613, and then outputs the simplified Gaussian soft-de-mapped signal to the channel decoder 621.

The channel decoder 621 performs channel decoding with respect to the signal output from the simplified Gaussian soft de-mapper 617.

Although it is illustrated in FIG. 6 that the signal receiving apparatus is implemented with separate units such as the waveform pre-processor 611, the controller 613, the noise whitener 615, the simplified Gaussian soft de-mapper 617, the non-Gaussian soft de-mapper 619, the channel decoder 621, the non-Gaussian characteristic estimator 623, and the (interference+noise) level parameter update unit 625, the signal receiving apparatus may be implemented in such a way that at least two of the waveform pre-processor 611, the controller 613, the noise whitener 615, the simplified Gaussian soft de-mapper 617, the non-Gaussian soft de-mapper 619, the channel decoder 621, the non-Gaussian characteristic estimator 623, and the (interference+noise) level parameter update unit 625 are integrated. The signal receiving apparatus may be implemented with one processor or one chipset.

A description has been made of another example of the internal structure of the signal receiving apparatus in the multi-carrier communication system having the non-orthogonal waveform according to an embodiment of the present disclosure with reference to FIG. 6, and next, referring to FIG. 7, a description will be made of another example of the internal structure of the signal receiving apparatus in the multi-carrier communication system having the non-orthogonal waveform according to an embodiment of the present disclosure.

Figure 7:
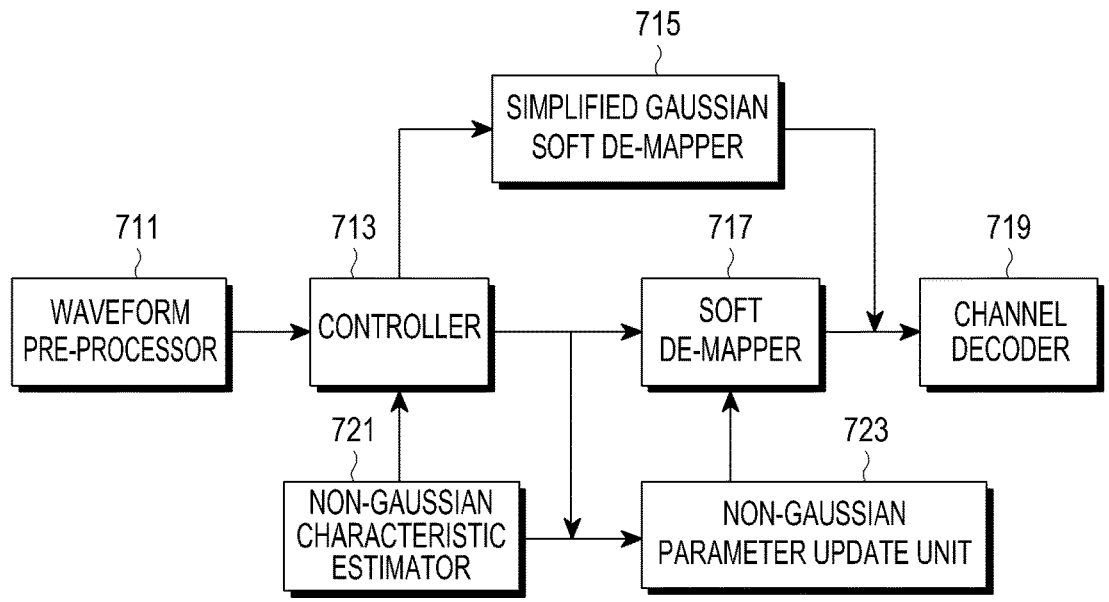
FIG. 7 illustrates another example of an internal structure of a signal receiving apparatus in a multi-carrier communication system having a non-orthogonal waveform according to an embodiment of the present disclosure.

FIG. 7 illustrates another example of an internal structure of a signal receiving apparatus in a multi-carrier communication system having a non-orthogonal waveform according to an embodiment of the present disclosure.

Referring to FIG. 7, the signal receiving apparatus may include a waveform pre-processor 711, a controller 713, a simplified Gaussian soft de-mapper 715, a soft de-mapper 717, a channel decoder 719, a non-Gaussian characteristic estimator 721, and a non-Gaussian parameter update unit 723.

The waveform pre-processor 711 performs waveform pre-processing with respect to an input signal, and outputs the waveform-pre-processed signal to the controller 713. Herein, the waveform pre-processor 711 performs waveform pre-processing based on a multiplexing scheme used in a multi-carrier system supporting the non-orthogonal waveform. An operation of the waveform pre-processor 711 is the same as those described above with reference to FIG. 1, and thus will not be described in detail at this time.

Meanwhile, the controller 713 checks if the waveform pre-processed signal output from the waveform pre-processor 711 is a Gaussian proximity signal based on non-Gaussian characteristics output from the non-Gaussian characteristic estimator 721. Non-Gaussian characteristic estimation performed by the non-Gaussian characteristic estimator 721 is the same as described with reference to FIG. 1, and thus will not be described in detail at this time.

If the waveform pre-processed signal output from the waveform pre-processor 711 is not a Gaussian proximity signal as a result of checking, the controller 713 outputs the waveform pre-processed signal output from the waveform pre-processor 711 to the soft de-mapper 717 and the non-Gaussian parameter update unit 723.

The controller 713 outputs the waveform pre-processed signal to the simplified Gaussian soft de-mapper 715 if the waveform pre-processed signal output from the waveform pre-processor 711 is a Gaussian proximity signal as a result of checking.

When the controller 713 outputs the waveform pre-processed signal output from the waveform pre-processor 711 to the soft de-mapper 717, the soft de-mapper 717 performs soft de-mapping with respect to a signal output from the controller 713 based on at least one of a shape parameter and a scale parameter that are output from the non-Gaussian parameter update unit 723, and then outputs the soft-de-mapped signal to the channel decoder 719. An operation of the non-Gaussian parameter update unit 723 is the same as those described above with reference to FIGS. 1 and 2, and thus will not be described in detail at this time.

The channel decoder 719 performs channel decoding with respect to a signal output from the soft de-mapper 717.

When the controller 713 outputs the waveform pre-processed signal output from the waveform pre-processor 711 to the simplified Gaussian soft de-mapper 715, the simplified Gaussian soft de-mapper 715 performs simplified Gaussian soft de-mapping with respect to a signal output from the controller 713, and then outputs the simplified Gaussian soft-de-mapped signal to the channel decoder 719.

The channel decoder 719 performs channel decoding with respect to a signal output from the soft de-mapper 717.

Although it is illustrated in FIG. 7 that the signal receiving apparatus is implemented with separate units such as the waveform pre-processor 711, the controller 713, the simplified Gaussian soft de-mapper 715, the non-Gaussian soft de-mapper 717, the channel decoder 719, the non-Gaussian characteristic estimator 721, and the non-Gaussian parameter update unit 723, the signal receiving apparatus may be implemented in such a way that at least two of the waveform pre-processor 711, the controller 713, the simplified Gaussian soft de-mapper 715, the non-Gaussian soft de-mapper 717, the channel decoder 719, the non-Gaussian characteristic estimator 721, and the non-Gaussian parameter update unit 723 are integrated. The signal receiving apparatus may be implemented with one processor or one chipset.

A description has been made of another example of the internal structure of the signal receiving apparatus in the multi-carrier communication system having the non-orthogonal waveform according to an embodiment of the present disclosure with reference to FIG. 7, and next, referring to FIG. 8, a description will be made of another example of the internal structure of the signal receiving apparatus in the multi-carrier communication system having the non-orthogonal waveform according to an embodiment of the present disclosure.

Figure 8:
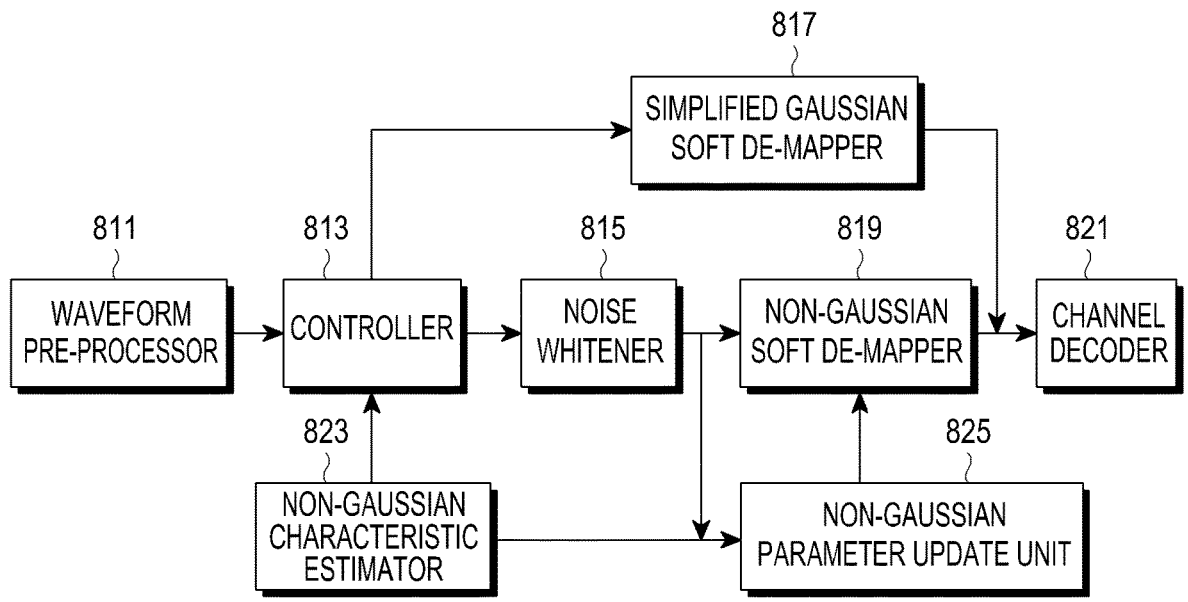
FIG. 8 illustrates another example of an internal structure of a signal receiving apparatus in a multi-carrier communication system having a non-orthogonal waveform according to an embodiment of the present disclosure.

FIG. 8 illustrates another example of an internal structure of a signal receiving apparatus in a multi-carrier communication system having a non-orthogonal waveform according to an embodiment of the present disclosure.

Referring to FIG. 8, the signal receiving apparatus may include a waveform pre-processor 811, a controller 813, a noise whitener 815, a simplified Gaussian soft de-mapper 817, a non-Gaussian soft de-mapper 819, a channel decoder 821, a non-Gaussian characteristic estimator 823, and a non-Gaussian parameter update unit 825.

The waveform pre-processor 811 performs waveform pre-processing with respect to an input signal, and outputs the waveform-pre-processed signal to the controller 813. Herein, the waveform pre-processor 811 performs waveform pre-processing based on a multiplexing scheme used in a multi-carrier system supporting the non-orthogonal waveform. An operation of the waveform pre-processor 811 is the same as those described above with reference to FIG. 1, and thus will not be described in detail at this time.

Meanwhile, the controller 813 checks if the waveform pre-processed signal output from the waveform pre-processor 811 is a Gaussian proximity signal based on non-Gaussian characteristics output from the non-Gaussian characteristic estimator 823. Non-Gaussian characteristic estimation performed by the non-Gaussian characteristic estimator 823 is the same as described with reference to FIG. 1, and thus will not be described in detail at this time.

If the waveform pre-processed signal output from the waveform pre-processor 811 is not a Gaussian proximity signal as a result of checking, the controller 813 outputs the waveform pre-processed signal output from the waveform pre-processor 811 to the noise whitener 815.

First, the noise whitener 815 performs whitening with respect to a signal output from the controller 813 in the frequency domain, and outputs the whitened signal to the soft de-mapper 819 and the non-Gaussian parameter update unit 825. Herein, the noise whitener 815 may perform whitening in the frequency domain with respect to noise whose sub-carrier-specific characteristics are changed due to equalization and filtering performed by the waveform pre-processor 811, such that the sub-carrier-specific characteristics are the same. A detailed operation of the noise whitener 815 is the same as those described above with reference to FIG. 1, and thus will not be described in detail at this time.

The signal whitened by the noise whitener 815 is output to the non-Gaussian soft de-mapper 819 which then performs non-Gaussian soft de-mapping with respect to the whitened signal output from the noise whitener 815 based on at least one of a shape parameter and a scale parameter that are output from the non-Gaussian parameter update unit 825 and then outputs the non-Gaussian soft-de-mapped signal to the channel decoder 821. An operation of the non-Gaussian parameter update unit 825 is the same as those described above with reference to FIGS. 1 and 2, and thus will not be described in detail at this time.

The channel decoder 821 performs channel decoding with respect to a signal output from the non-Gaussian soft de-mapper 819.

When the controller 813 outputs the waveform pre-processed signal output from the waveform pre-processor 811 to the simplified Gaussian soft de-mapper 817, the simplified Gaussian soft de-mapper 817 performs simplified Gaussian soft de-mapping with respect to a signal output from the controller 813, and then outputs the simplified Gaussian soft-de-mapped signal to the channel decoder 821.

The channel decoder 821 performs channel decoding with respect to the signal output from the simplified Gaussian soft de-mapper 817.

Although it is illustrated in FIG. 8 that the signal receiving apparatus is implemented with separate units such as the waveform pre-processor 811, the controller 813, the noise whitener 815, the simplified Gaussian soft de-mapper 817, the non-Gaussian soft de-mapper 819, the channel decoder 821, the non-Gaussian characteristic estimator 823, and the non-Gaussian parameter update unit 825, the signal receiving apparatus may be implemented in such a way that at least two of the waveform pre-processor 811, the controller 813, the noise whitener 815, the simplified Gaussian soft de-mapper 817, the non-Gaussian soft de-mapper 819, the channel decoder 821, the non-Gaussian characteristic estimator 823, and the non-Gaussian parameter update unit 825 are integrated. The signal receiving apparatus may be implemented with one processor or one chipset.

A description has been made of another example of the internal structure of the signal receiving apparatus in the multi-carrier communication system having the non-orthogonal waveform according to an embodiment of the present disclosure with reference to FIG. 8, and next, referring to FIG. 9, a description will be made of a process of transmitting/receiving feedback information between an eNB and a UE in the multi-carrier communication system having the non-orthogonal waveform according to an embodiment of the present disclosure.

Figure 9:
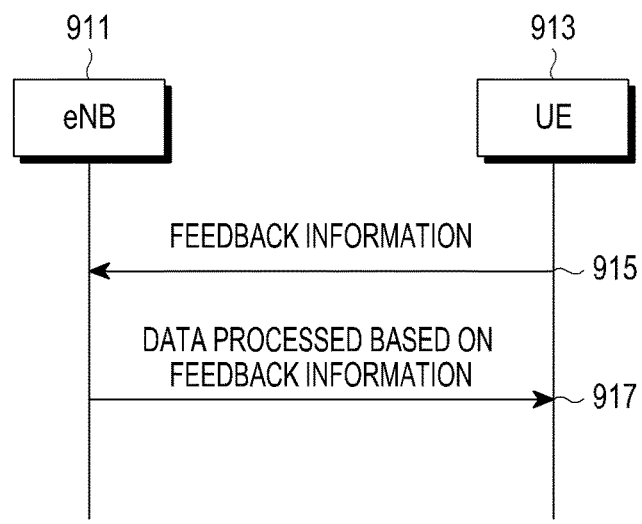
FIG. 9 illustrates a process of transmitting/receiving feedback information between an evolved NodeB (eNB) and a user equipment (UE) in a multi-carrier communication system having a non-orthogonal waveform according to an embodiment of the present disclosure.

FIG. 9 illustrates a process of transmitting/receiving feedback information between an eNB and a UE in a multi-carrier communication system having a non-orthogonal waveform according to an embodiment of the present disclosure.

Referring to FIG. 9, a UE 913 uses at least two filter banks, and is assumed to use, for example, three filter banks in FIG. 9.

First, when filters having different SIRs are grouped to generate filter groups and channel encoding is separately performed with respect to each filter group, non-Gaussian characteristics may increase. Thus, the UE 913 selects a particular filter bank from among filter banks included in the UE 913 to increase non-Gaussian characteristics.

When the UE 913 uses two or more filter banks, the UE 913 selects a filter bank group to which the same encoding scheme is applicable.

When the UE 913 uses three filter banks and performs encoding for each filter bank, encoding may be indicated by ((F1), (F2), (F3)).

When the UE 913 performs encoding by applying the same encoding scheme to at least two filter banks, encoding may be indicated by ((F1, F2), F3), ((F1, F3), F2), (F1, (F2, F3)). Applying the same encoding scheme to at least two filter banks in this way may be effective only when an SIR difference is large, such that the number of selectable combinations may be reduced in advance by SIR comparison.

When the UE 913 performs encoding by applying the same encoding scheme to the three filter banks, encoding may be indicated by (F1, F2, F3).

Thus, the UE 913 estimates an MCS level for each case to select a case where a sum rate is maximum, and generates feedback information, which includes the MCS level corresponding to the maximum sum rate and information about a filter bank group to which the same encoding is applied.

The UE 913 transmits the generated feedback information to an eNB 911. After receiving the feedback information from the UE 913, the eNB 911 processes data regarding the UE 913 based on the received feedback information and transmits the processed data to the UE 913 in operation 917.

Meanwhile, the above description has been made of a signal receiving process in a multi-carrier communication system having a non-orthogonal waveform when a single input single output (SISO) scheme is used. However, an embodiment of the present disclosure is also applicable to a multiple input multiple output (MIMO) scheme as well as the SISO scheme.

When an LLR is calculated separately for each stream of a received signal like a linear MIMO equalizer or a successive interference cancellation (SIC) scheme, the received signal may be modeled to a non-Gaussian distribution for each stream like the SISO scheme. When whitening is performed in a space domain, each stream has the same parameter.

Meanwhile, in a maximum likelihood (ML) detection scheme that jointly receives a transmission signal of an entire stream for each subcarrier instead of a linear equalizer, characteristics of random variables as many as the number of streams or the number of reception antennas may be jointly estimated. In this case, estimation of a covariance matrix between the shape parameter and an antenna may be needed.

The shape parameter may be calculated based on a filter interference table, an SNR, and the number of reception antennas, as described above. The shape parameter may be calculated based on the number of streams when equalization is performed with respect to a received signal.

A form of a covariance matrix to be estimated changes with whether whitening is performed in the frequency domain or whitening is performed in the space and frequency domains, at a pre-processing stage. For example, an Euclidean distance-based vector symbol is selected in a hard maximum likelihood (MLD) scheme in the same manner as Gaussian distribution assumption; in a soft MLD scheme, a non-Gaussian distribution-based soft de-mapper is needed.

Figure 10:
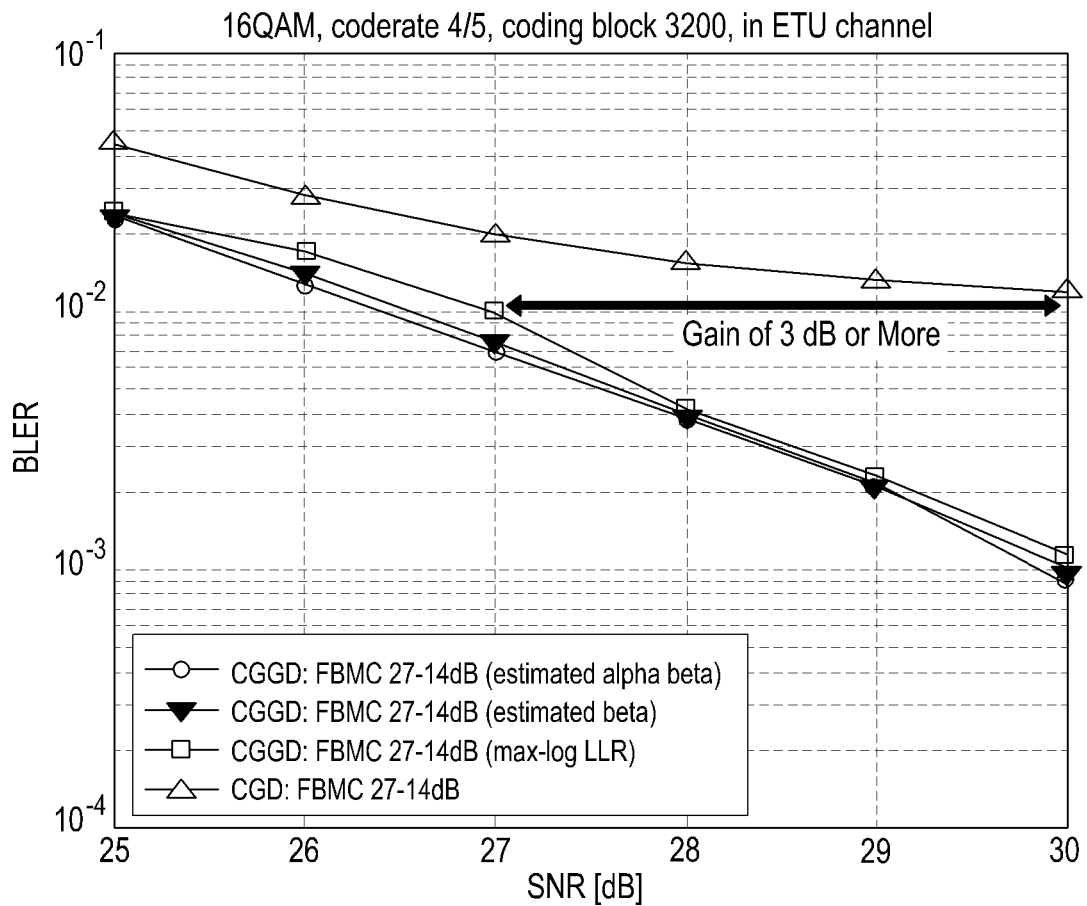
FIG. 10 illustrates a receiving block error rate (BLER) in a multi-carrier communication system having a non-orthogonal waveform according to an embodiment of the present disclosure.

With reference to FIG. 10, a description will be made of a receiving block error rate (BLER) in a multi-carrier communication system having a non-orthogonal waveform according to an embodiment of the present disclosure.

FIG. 10 illustrates a receiving BLER in a multi-carrier communication system having a non-orthogonal waveform according to an embodiment of the present disclosure.

Referring to FIG. 10, an embodiment of the present disclosure proposes a non-Gaussian soft de-mapper which models and uses residual interference through characteristics of a non-orthogonal waveform, for example, an interference table and an SNR. For example, in a communication system supporting a QAM-FBMC scheme, there is a limitation in increasing a self-SIR of a filter while maintaining relatively good characteristics with respect to spectrum confinement, without reduction in terms of a data rate.

Thus, an embodiment of the present disclosure proposes a filter bank in which an SIR is asymmetric to prevent a loss in terms of channel estimation. However, when an MCS level is increased and the same channel encoding scheme is applied to two filter banks, performance is limited by a relatively poor SIR, causing error flooring. Therefore, in an embodiment of the present disclosure, performance of about 3 dB or more may be improved in a BLER of 10-2 by using a non-Gaussian soft de-mapper.

Moreover, in an embodiment of the present disclosure, when the shape parameter is estimated offline based on characteristics of a filter (for example, an SNR is assumed to be 25 dB) and only the scale parameter is updated, there is no performance degradation, and when the scale parameter is not changed for each channel encoding block, a result based on log-max approximation shows that only performance degradation of 1 dB or less exists in a BLER of 10-2 and a performance improvement of 3 dB may be still secured when compared to the Gaussian soft de-mapper. As a result, an embodiment of the present disclosure has proved that offline parameter estimation is possible.

A description has been made of the receiving BLER in the multi-carrier communication system having the non-orthogonal waveform according to an embodiment of the present disclosure with reference to FIG. 10, and next, referring to FIG. 11, a description will be made of non-Gaussian characteristics of residual interference in the multi-carrier communication system having the non-orthogonal waveform according to an embodiment of the present disclosure.

Figure 11:
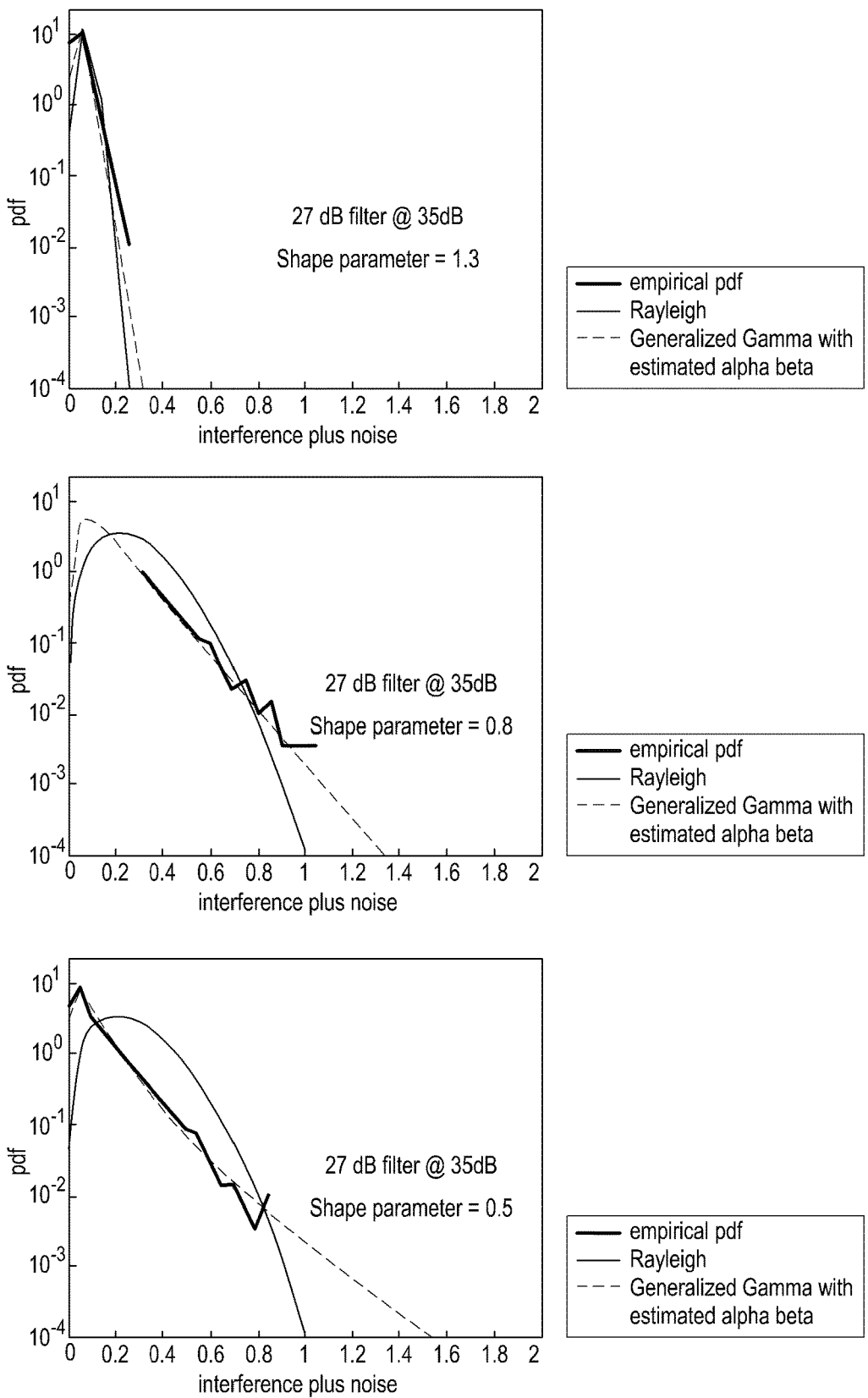
FIG. 11 illustrates non-Gaussian characteristics of residual interference in a multi-carrier communication system having a non-orthogonal waveform according to an embodiment of the present disclosure.

FIG. 11 illustrates non-Gaussian characteristics of residual interference in a multi-carrier communication system having a non-orthogonal waveform according to an embodiment of the present disclosure.

FIG. 11 shows non-Gaussian characteristics of residual interference for a filter corresponding to a shape parameter of 1.3 (shape parameter=1.3), non-Gaussian characteristics of residual interference for a filter corresponding to a shape parameter of 0.8 (shape parameter=0.8), and non-Gaussian characteristics of residual interference for a filter corresponding to a shape parameter of 0.5 (shape parameter=0.5). For example, when residual interference indicates Gaussian characteristics, the shape parameter is 2 (shape parameter=2).

A description has been made of the non-Gaussian characteristics of residual interference in the multi-carrier communication system having the non-orthogonal waveform according to an embodiment of the present disclosure with reference to FIG. 11, and next, referring to FIG. 12, a description will be made of non-Gaussian characteristics of residual interference when a GFDM scheme is used in the multi-carrier communication system having the non-orthogonal waveform according to an embodiment of the present disclosure.

Figure 12:
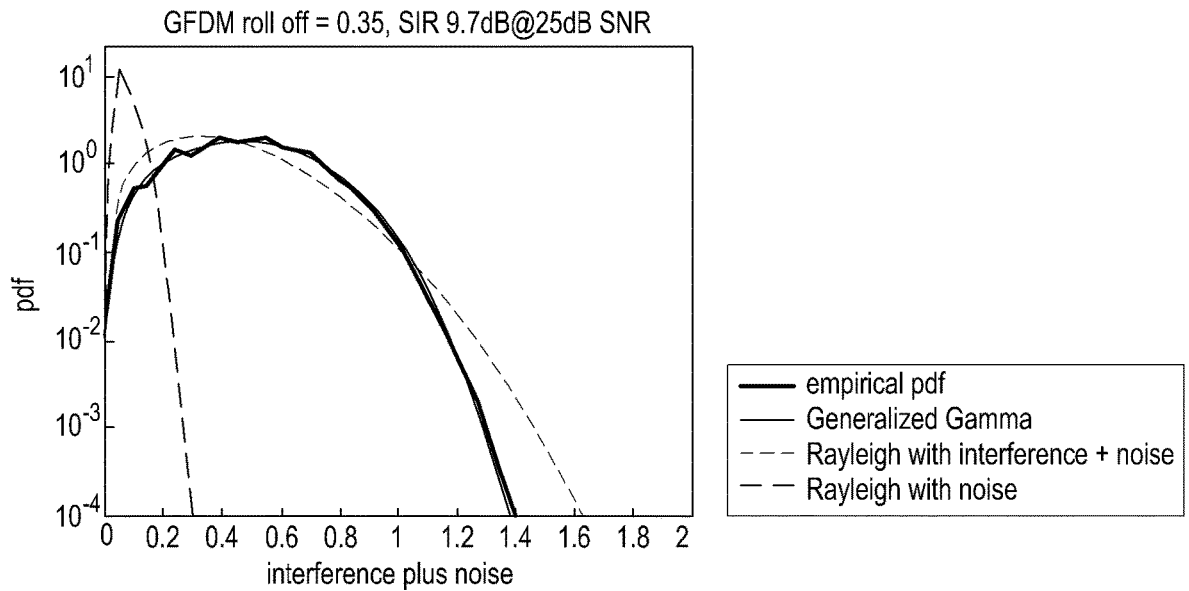
FIG. 12 illustrates non-Gaussian characteristics of residual interference when a GFDM scheme is used in a multi-carrier communication system having a non-orthogonal waveform according to an embodiment of the present disclosure.

FIG. 12 illustrates non-Gaussian characteristics of residual interference when a GFDM scheme is used in a multi-carrier communication system having a non-orthogonal waveform according to an embodiment of the present disclosure.

Referring to FIG. 12, non-Gaussian characteristics of residual interference shown in FIG. 12 use the GFDM scheme, and indicate the non-Gaussian characteristics of the residual interference when a square-root-raised-cosine (SRRC) filter is used. Herein, a self-SIR of the SRRC filter is 9.7 dB in an SNR of 25 dB.

A description has been made of the non-Gaussian characteristics of residual interference when the GFDM scheme is used in the multi-carrier communication system having the non-orthogonal waveform according to an embodiment of the present disclosure with reference to FIG. 12, and next, referring to FIG. 13, a description will be made of non-Gaussian characteristics of residual interference when a QAM-FBMC scheme is used in the multi-carrier communication system having the non-orthogonal waveform according to an embodiment of the present disclosure.

Figure 13:
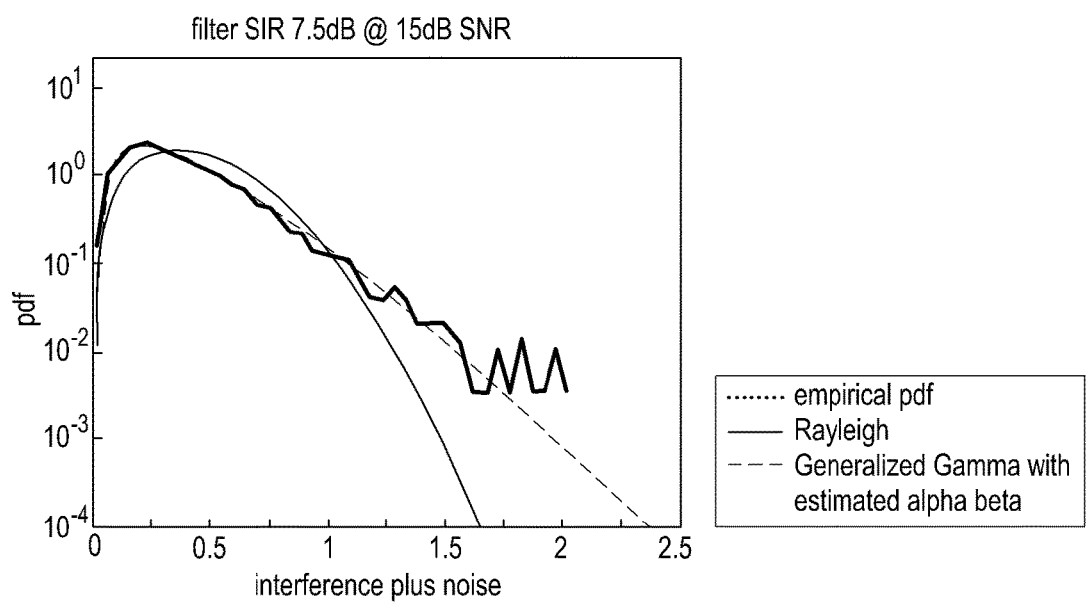
FIG. 13 illustrates non-Gaussian characteristics of residual interference when a QAM-FBMC scheme is used in a multi-carrier communication system having a non-orthogonal waveform according to an embodiment of the present disclosure.

FIG. 13 illustrates non-Gaussian characteristics of residual interference when a QAM-FBMC scheme is used in a multi-carrier communication system having a non-orthogonal waveform according to an embodiment of the present disclosure.

Referring to FIG. 13, non-Gaussian characteristics of residual interference shown in FIG. 13 use the QAM-FBMC scheme, and indicate the non-Gaussian characteristics of the residual interference when a physical layer for dynamic spectrum access and cognitive radio (PHYDYAS) filter is used. Herein, a self-SIR of the PHYDYAS filter is 7.5 dB in an SNR of 15 dB.

A description has been made of the non-Gaussian characteristics of residual interference when the QAM-FBMC scheme is used in the multi-carrier communication system having the non-orthogonal waveform according to an embodiment of the present disclosure with reference to FIG. 13, and next, referring to FIG. 14, a description will be made of characteristics of residual interference caused by an operation of a non-Gaussian soft de-mapper when the MIMO scheme is used in the multi-carrier communication system having the non-orthogonal waveform according to an embodiment of the present disclosure.

Figure 14:
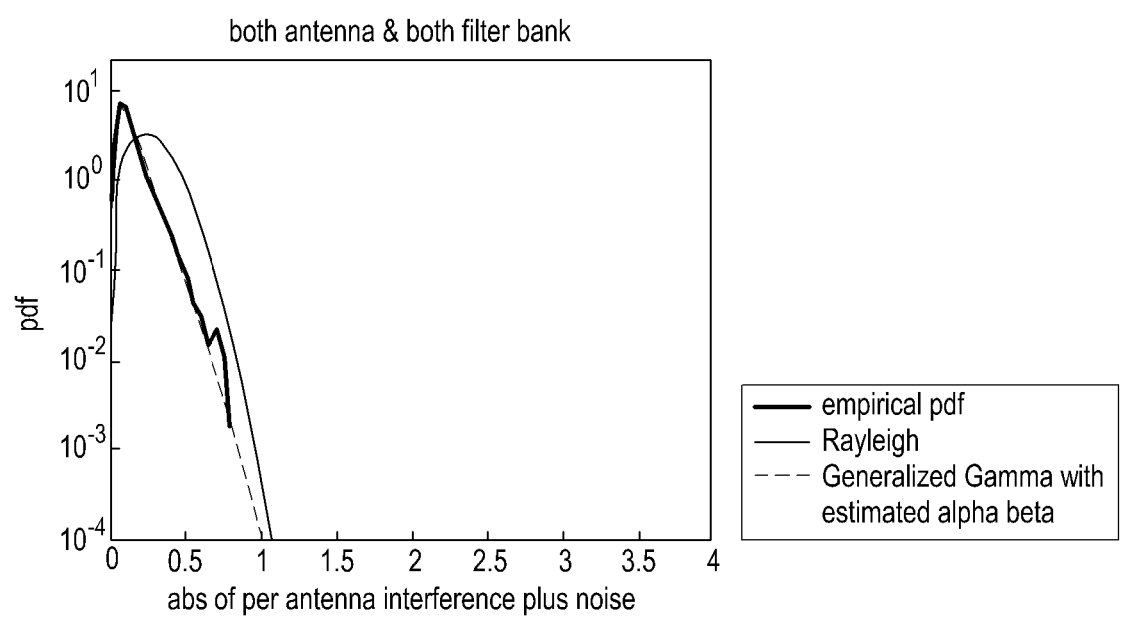
FIG. 14 illustrates characteristics of residual interference corresponding to an operation of a non-Gaussian soft de-mapper when a multiple input multiple output (MIMO) scheme is used in a multi-carrier communication system having a non-orthogonal waveform according to an embodiment of the present disclosure.

FIG. 14 illustrates characteristics of residual interference corresponding to an operation of a non-Gaussian soft de-mapper when an MIMO scheme is used in a multi-carrier communication system having a non-orthogonal waveform according to an embodiment of the present disclosure.

Referring to FIG. 14, it is assumed that the number of transmission antennas used by the signal transmitting apparatus is Nt and the number of reception antennas used by the signal receiving apparatus is Nr.

When an LLR is calculated separately for each stream of a received signal like a linear MIMO equalizer or an SIC scheme, the received signal may be modeled to a non-Gaussian distribution for each stream like the SISO scheme. When whitening is performed in a space domain, each stream has the same parameter.

Meanwhile, in the ML detection scheme that jointly receives a transmission signal of an entire stream for each subcarrier instead of a linear equalizer, characteristics of random variables as many as the number of streams or the number of reception antennas may be jointly estimated. In this case, estimation of a covariance matrix between the shape parameter and an antenna may be needed.

The shape parameter may be calculated based on a filter interference table, an SNR, and the number of reception antennas Nr, as described above. The shape parameter may be calculated based on the number of streams when equalization is performed with respect to a received signal.

A form of a covariance matrix to be estimated changes with whether whitening is performed in the frequency domain or whitening is performed in the space and frequency domains, at a pre-processing stage. For example, the Euclidean distance-based vector symbol is selected in the hard MLD scheme in the same manner as Gaussian distribution assumption; in the soft MLD scheme, a non-Gaussian distribution-based soft de-mapper is needed.

A description has been made of the characteristics of the residual interference caused by an operation of a non-Gaussian soft de-mapper when the MIMO scheme is used in the multi-carrier communication system having the non-orthogonal waveform according to an embodiment of the present disclosure with reference to FIG. 14, and next, referring to FIG. 15, a description will be made of another example of the internal structure of the signal receiving apparatus in the multi-carrier communication system having the non-orthogonal waveform according to an embodiment of the present disclosure.

Figure 15:
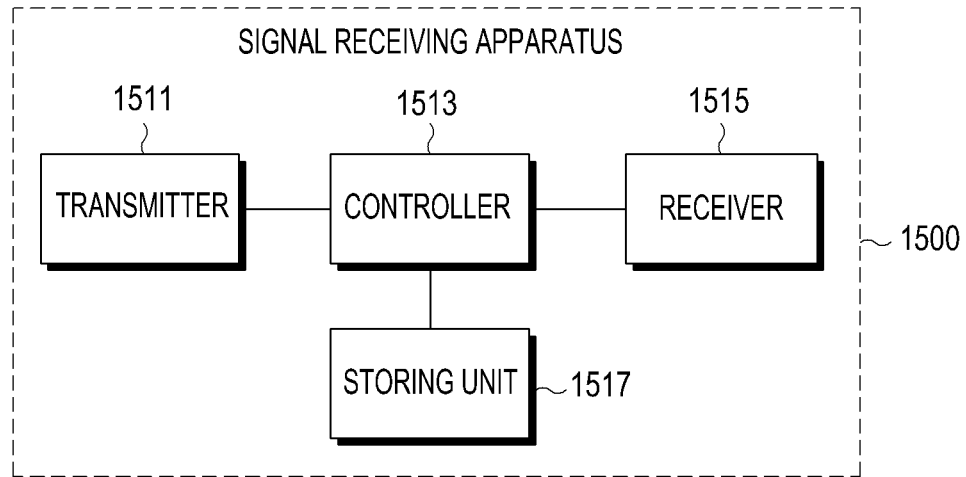
FIG. 15 illustrates another example of an internal structure of a signal receiving apparatus in a multi-carrier communication system having a non-orthogonal waveform according to an embodiment of the present disclosure.

FIG. 15 illustrates another example of an internal structure of a signal receiving apparatus in a multi-carrier communication system having a non-orthogonal waveform according to an embodiment of the present disclosure.

Referring to FIG. 15, a signal receiving apparatus 1500 may include a transmitter 1511, a controller 1513, a receiver 1515, and a storing unit 1517.

The controller 1513 controls an overall operation of the signal receiving apparatus 1500, especially, an operation associated with signal transmission/reception in the multi-carrier communication system having the non-orthogonal waveform according to an embodiment of the present disclosure. The operation associated with signal transmission/reception in the multi-carrier communication system having the non-orthogonal waveform according to an embodiment of the present disclosure is the same as described with reference to FIGS. 1 through 14, and thus will not be described in detail.

The transmitter 1511 transmits various signals and various messages to the other entities included in the multi-carrier communication system under control of the controller 1513. Herein, the various signals and various messages transmitted by the transmitter 1511 are the same as those described with reference to FIGS. 1 and 14, and thus will not be described in detail at this time.

The receiver 1515 receives various signals and various messages from the other entities included in the multi-carrier communication system, under control of the controller 1513. Herein, various messages received by the receiver 1515 are the same as those described above with reference to FIGS. 1 through 14, and thus will not be described in detail at this time.

The storing unit 1517 stores programs and various data which are associated with signal transmission/reception performed by the signal receiving apparatus 1500 in the multi-carrier communication system having the non-orthogonal waveform according to an embodiment of the present disclosure, under control of the controller 1513.

The storing unit 1517 also stores various signals and various messages received by the receiver 1515 from the other entities.

In FIG. 15, the signal receiving apparatus 1500 is illustrated as being implemented with separate units such as the transmitter 1511, the controller 1513, the receiver 1515, and the storing unit 1517, but the signal receiving apparatus 1500 may also be implemented with an integrated form of at least two of the transmitter 1511, the controller 1513, the receiver 1515, and the storing unit 1517. The signal receiving apparatus 1500 may be implemented with one processor or one chipset.

A description has been made of another example of the internal structure of the signal receiving apparatus in the multi-carrier communication system having the non-orthogonal waveform according to an embodiment of the present disclosure with reference to FIG. 15, and next, referring to FIG. 16, a description will be made of an example of an internal structure of a signal transmitting apparatus in the multi-carrier communication system having the non-orthogonal waveform according to an embodiment of the present disclosure.

Figure 16:
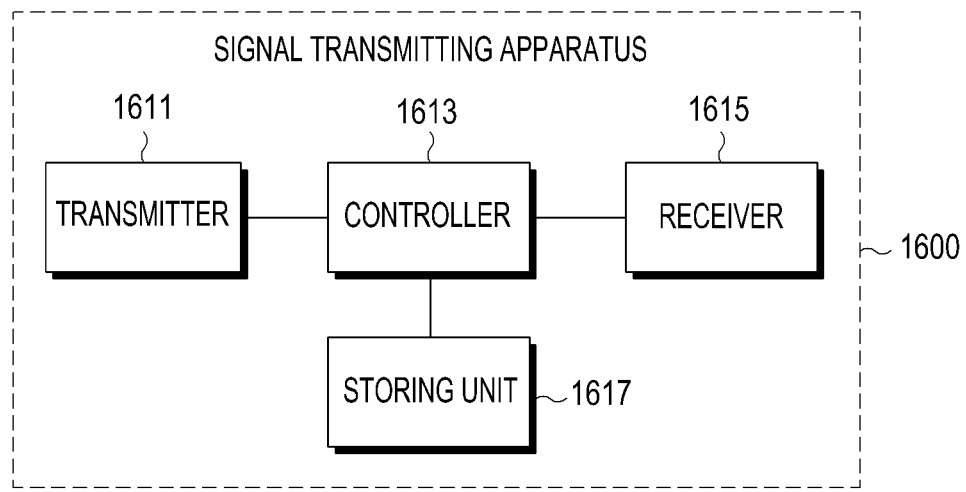
FIG. 16 illustrates another example of an internal structure of an apparatus for transmitting a signal (or a signal transmitting apparatus) in a multi-carrier communication system having a non-orthogonal waveform according to an embodiment of the present disclosure.

FIG. 16 illustrates another example of an internal structure of a signal transmitting apparatus in a multi-carrier communication system having a non-orthogonal waveform according to an embodiment of the present disclosure.

Referring to FIG. 16, a signal transmitting apparatus 1600 may include a transmitter 1611, a controller 1613, a receiver 1615, and a storing unit 1617.

The controller 1613 controls an overall operation of the signal transmitting apparatus 1600, especially, an operation associated with signal transmission/reception in the multi-carrier communication system having the non-orthogonal waveform according to an embodiment of the present disclosure. The operation associated with signal transmission/reception in the multi-carrier communication system having the non-orthogonal waveform according to an embodiment of the present disclosure is the same as described with reference to FIGS. 1 through 14, and thus will not be described in detail.

The transmitter 1611 transmits various signals and various messages to the other entities included in the multi-carrier communication system under control of the controller 1613. Herein, the various signals and various messages transmitted by the transmitter 1611 are the same as those described with reference to FIGS. 1 and 14, and thus will not be described in detail at this time.

The receiver 1615 receives various signals and various messages from the other entities included in the multi-carrier communication system, under control of the controller 1613. Herein, various messages received by the receiver 1615 are the same as those described above with reference to FIGS. 1 through 14, and thus will not be described in detail at this time.

The storing unit 1617 stores programs and various data which are associated with signal transmission/reception performed by the signal transmitting apparatus 1600 in the multi-carrier communication system having the non-orthogonal waveform according to an embodiment of the present disclosure, under control of the controller 1613.

The storing unit 1617 also stores various signals and various messages received by the receiver 1615 from the other entities.

In FIG. 16, the signal transmitting apparatus 1600 is illustrated as being implemented with separate units such as the transmitter 1611, the controller 1613, the receiver 1615, and the storing unit 1617, but the signal transmitting apparatus 1600 may also be implemented with an integrated form of at least two of the transmitter 1611, the controller 1613, the receiver 1615, and the storing unit 1617. The signal transmitting apparatus 1600 may be implemented with one processor or one chipset.

Particular aspects of the present disclosure may be implemented with a computer-readable code on a computer-readable recording medium. The computer readable recording medium may be any type of data storage device that may store data readable by a computer system. Examples of recording mediums readable by the computer may include a read-only memory (ROM), a random-access memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such arbitrary software may be stored, for example, in a volatile or non-volatile storage device (e.g., a read only memory (ROM), etc.), a memory (e.g., a random-access memory (RAM), a memory chip, a memory device, or a memory integrated circuit (IC)), or a machine (e.g., computer) recordable optical or magnetic storage medium (e.g., a compact disk (CD), a digital versatile disk (DVD), a magnetic disc, a magnetic tape, etc.) regardless of its ability to erase or rewrite. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. Furthermore, the program may be electronically transferred by an arbitrary medium, such as a communication signal transmitted through a wired or wireless connection, and the present invention appropriately includes equivalents of the program.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

An embodiment of the present disclosure enables transmission/reception of a signal in a multi-carrier communication system.

An embodiment of the present disclosure enables transmission/reception of a signal in a multi-carrier communication system in such a way to reduce reception complexity.

An embodiment of the present disclosure enables transmission/reception of a signal in a multi-carrier communication system in such a way to reduce latency.

An embodiment of the present disclosure makes it possible to transmit/receive a signal based on statistic characteristics of residual interference after equalization in a multi-carrier communication system.

An embodiment of the present disclosure enables transmission/reception of a signal in a multi-carrier communication system in such a way to increase non-Gaussian characteristics.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method for receiving a signal in a multi-carrier communication system, the method comprising:
performing waveform pre-processing with respect to an input signal based on at least one of equalization and filtering;
checking if the waveform pre-processed signal is a Gaussian proximity signal; and
performing soft de-mapping with respect to the waveform pre-processed signal based on a result of the checking.

2. The method of claim 1, wherein the performing soft de-mapping with respect to the waveform pre-processed signal based on the result of the checking comprises, if the waveform pre-processed signal is not the Gaussian proximity signal:
performing whitening with respect to the waveform pre-processed signal; and
performing soft de-mapping with respect to the whitened signal based on a non-Gaussian parameter.

3. The method of claim 1, wherein the performing soft de-mapping with respect to the waveform pre-processed signal based on the result of the checking comprises:
performing soft de-mapping with respect to the waveform pre-processed signal based on a non-Gaussian parameter, if the waveform pre-processed signal is not the Gaussian proximity signal.

4. The method of claim 3, wherein the non-Gaussian parameter comprises at least one of a shape parameter or a scale parameter.

5. The method of claim 1, wherein the performing soft de-mapping with respect to the waveform pre-processed signal based on the result of the checking comprises:
performing soft de-mapping with respect to the waveform pre-processed signal, if the waveform pre-processed signal is not the Gaussian proximity signal, or
performing simplified Gaussian soft de-mapping with respect to the waveform pre-processed signal, if the waveform pre-processed signal is the Gaussian proximity signal.

6. The method of claim 5, wherein the performing soft de-mapping with respect to the waveform pre-processed signal is based on non-Gaussian characteristics estimated based on a filter interference table, if the waveform pre-processed signal is not the Gaussian proximity signal.

7. The method of claim 1, wherein the performing soft de-mapping with respect to the waveform pre-processed signal based on the result of the checking comprises, if the waveform pre-processed signal is not the Gaussian proximity signal:
performing whitening with respect to the waveform pre-processed signal; and
performing soft de-mapping with respect to the whitened signal.

8. The method of claim 7, wherein the performing soft de-mapping with respect to the whitened signal is based on non-Gaussian characteristics estimated based on a filter interference table, if the waveform pre-processed signal is not the Gaussian proximity signal.

9. The method of claim 1, wherein the performing soft de-mapping with respect to the waveform pre-processed signal based on the result of the checking comprises:
performing soft de-mapping with respect to the waveform pre-processed signal based on a sum of interference and noise, if the waveform pre-processed signal is not the Gaussian proximity signal.

10. The method of claim 1, wherein the performing soft de-mapping with respect to the waveform pre-processed signal based on the result of the checking comprises, if the waveform pre-processed signal is not the Gaussian proximity signal:
performing whitening with respect to the waveform pre-processed signal; and performing non-Gaussian soft de-mapping with respect to the whitened signal, based on a sum of interference and noise.

11. An apparatus for receiving a signal in a multi-carrier communication system, the apparatus comprising:
a controller configured to:
perform waveform pre-processing with respect to an input signal based on at least one of equalization and filtering,
check if the waveform pre-processed signal is a Gaussian proximity signal, and
perform soft de-mapping with respect to the waveform pre-processed signal based on a result of the checking; and
a transceiver configured to transmit or receive signals and messages under control of the controller.

12. The apparatus of claim 11, wherein, to perform the soft de-mapping with respect to the waveform pre-processed signal based on the result of the checking, the controller is further configured to, if the waveform pre-processed signal is not the Gaussian proximity signal:
perform whitening with respect to the waveform pre-processed signal, and
perform soft de-mapping with respect to the whitened signal based on a non-Gaussian parameter.

13. The apparatus of claim 11, wherein the controller is further configured to perform the soft de-mapping with respect to the waveform pre-processed signal based on a non-Gaussian parameter, if the waveform pre-processed signal is not the Gaussian proximity signal.

14. The apparatus of claim 13, wherein the non-Gaussian parameter comprises at least one of a shape parameter or a scale parameter.

15. The apparatus of claim 11, wherein, to perform the soft de-mapping with respect to the waveform pre-processed signal based on the result of the checking, the controller is further configured to:
perform soft de-mapping with respect to the waveform pre-processed signal, if the waveform pre-processed signal is not the Gaussian proximity signal, or
perform simplified Gaussian soft de-mapping with respect to the waveform pre-processed signal, if the waveform pre-processed signal is the Gaussian proximity signal.

16. The apparatus of claim 15, wherein the controller is further configured to perform the soft de-mapping with respect to the waveform pre-processed signal based on non-Gaussian characteristics estimated based on a filter interference table, if the waveform pre-processed signal is not the Gaussian proximity signal.

17. The apparatus of claim 11, wherein, to perform the soft de-mapping with respect to the waveform pre-processed signal based on the result of the checking, the controller is further configured to, if the waveform pre-processed signal is not the Gaussian proximity signal:
perform whitening with respect to the waveform pre-processed signal, and
perform soft de-mapping with respect to the whitened signal.

18. The apparatus of claim 17, wherein the controller is further configured to perform the soft de-mapping with respect to the whitened signal based on non-Gaussian characteristics estimated based on a filter interference table.

19. The apparatus of claim 11, wherein the controller is further configured to perform the soft de-mapping with respect to the waveform pre-processed signal based on a sum of interference and noise, if the waveform pre-processed signal is not the Gaussian proximity signal.

20. The apparatus of claim 11, wherein, to perform the soft de-mapping with respect to the waveform pre-processed signal based on the result of the checking, the controller is further configured to, if the waveform pre-processed signal is not the Gaussian proximity signal:
perform whitening with respect to the waveform pre-processed signal, and
perform non-Gaussian soft de-mapping with respect to the whitened signal, based on a sum of interference and noise.

* * * * *